US012542894B2

(12) United States Patent
Hannuksela et al.

(10) Patent No.: US 12,542,894 B2
(45) Date of Patent: Feb. 3, 2026

(54) METHOD, AN APPARATUS AND A COMPUTER PROGRAM PRODUCT FOR IMPLEMENTING GRADUAL DECODING REFRESH

(71) Applicant: Nokia Technologies Oy, Espoo (FI)

(72) Inventors: Miska Matias Hannuksela, Tampere (FI); Limin Wang, Springfield, CA (US); Seungwook Hong, San Diego, CA (US); Krit Panusopone, San Diego, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/093,149

(22) Filed: Jan. 4, 2023

(65) Prior Publication Data

US 2023/0217017 A1    Jul. 6, 2023

Related U.S. Application Data

(60) Provisional application No. 63/296,576, filed on Jan. 5, 2022.

(51) Int. Cl.
*H04N 19/107* (2014.01)
*H04N 19/129* (2014.01)
*H04N 19/174* (2014.01)
*H04N 19/46* (2014.01)
*H04N 19/96* (2014.01)

(52) U.S. Cl.
CPC ......... *H04N 19/107* (2014.11); *H04N 19/129* (2014.11); *H04N 19/174* (2014.11); *H04N 19/46* (2014.11); *H04N 19/96* (2014.11)

(58) Field of Classification Search
None
See application file for complete search history.

(56) References Cited

U.S. PATENT DOCUMENTS

| 11,102,504 | B2 * | 8/2021 | Yamori | H04N 19/159 |
| 2021/0227262 | A1 * | 7/2021 | Sasaki | H04N 19/86 |
| 2021/0368196 | A1 * | 11/2021 | Choi | H04N 19/46 |
| 2021/0409698 | A1 * | 12/2021 | Sychev | H04N 19/593 |
| 2023/0199223 | A1 * | 6/2023 | Jhu | H04N 19/103 |
| | | | | 375/240.02 |

FOREIGN PATENT DOCUMENTS

| CA | 3223625 A1 * | 5/2021 | ........... H04N 19/119 |
| WO | WO-2020215101 A1 * | 10/2020 | ........... H04N 19/105 |
| WO | WO-2021061285 A1 * | 4/2021 | ............... H04N 1/64 |
| WO | WO-2021133519 A1 * | 7/2021 | ........... H04N 19/107 |

* cited by examiner

*Primary Examiner* — Tyler W. Sullivan
(74) *Attorney, Agent, or Firm* — McCarter & English, LLP

(57) ABSTRACT

The present embodiments relate to a method for encoding and a technical equipment for implementing the method. The method includes receiving a sequence of pictures to be encoded; defining a refresh period for coded pictures, wherein the decoded recovery point picture and all subsequent decoded pictures in output order are correct in content when starting decoding from the random access point picture. The encoding further includes determining the size of the refreshed area; selecting a number of sample columns or rows outside a conformance cropping window so that a boundary between the refreshed area and the unrefreshed area of the picture is aligned with a coding tree unit boundary.

15 Claims, 11 Drawing Sheets

METHOD, AN APPARATUS AND A COMPUTER PROGRAM PRODUCT FOR IMPLEMENTING GRADUAL DECODING REFRESH

CROSS REFERENCE TO RELATED APPLICATION

This patent application claims priority under 35 USC 119(e) from U.S. Provisional Patent Application No. 63/296,576, filed on Jan. 5, 2022, the disclosure of which is hereby incorporated by reference in its entirety.

TECHNICAL FIELD

The present solution generally relates to video encoding and video decoding. In particular, the present solution relates to gradual decoding refresh.

BACKGROUND

This section is intended to provide a background or context to the invention that is recited in the claims. The description herein may include concepts that could be pursued but are not necessarily ones that have been previously conceived or pursued. Therefore, unless otherwise indicated herein, what is described in this section is not prior art to the description and claims in this application and is not admitted to be prior art by inclusion in this section.

A video coding system may comprise an encoder that transforms an input video into a compressed representation suited for storage/transmission and a decoder that can uncompress the compressed video representation back into a viewable form. The encoder may discard some information in the original video sequence in order to represent the video in a more compact form, for example, to enable the storage/transmission of the video information at a lower bitrate than otherwise might be needed.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

Various aspects include a method, an apparatus and a computer readable medium comprising a computer program stored therein, which are characterized by what is stated in the independent claims. Various embodiments are disclosed in the dependent claims.

According to a first aspect, there is provided an apparatus comprising means for receiving a sequence of pictures to be encoded; means for defining a refresh period for coded pictures, the refresh period being from a random access point picture, inclusive, to a recovery point picture, exclusive, wherein the decoded recovery point picture and all subsequent decoded pictures in output order are correct in content when starting decoding from the random access point picture; means for encoding a picture within the refresh period, the picture comprising a refreshed area and unrefreshed area, wherein the encoding is constrained in a manner that the decoded refreshed area is correct in content when starting decoding from the random access point picture, and the apparatus further comprises: means for determining the size of the refreshed area; means for selecting a number of sample columns or rows outside a conformance cropping window so that a boundary between the refreshed area and the unrefreshed area of the picture is aligned with a coding tree unit boundary, wherein a coding tree unit is characterized in one or both of: one or more prediction processes are disabled across the coding tree unit boundary; the coding tree unit is a root unit for partitioning into coding blocks or transform blocks; means for indicating the selected number in or along the bitstream.

According to a second aspect, there is provided a method, comprising: receiving a sequence of pictures to be encoded; defining a refresh period for coded pictures, the refresh period being from a random access point picture, inclusive, to a recovery point picture, exclusive, wherein the decoded recovery point picture and all subsequent decoded pictures in output order are correct in content when starting decoding from the random access point picture; encoding a picture within the refresh period, the picture comprising a refreshed area and unrefreshed area, wherein the encoding is constrained in a manner that the decoded refreshed area is correct in content when starting decoding from the random access point picture, and the encoding further comprises: determining the size of the refreshed area; selecting a number of sample columns or rows outside a conformance cropping window so that a boundary between the refreshed area and the unrefreshed area of the picture is aligned with a coding tree unit boundary, wherein a coding tree unit is characterized in one or both of: one or more prediction processes are disabled across the coding tree unit boundary; the coding tree unit is a root unit for partitioning into coding blocks or transform blocks; indicating the selected number in or along the bitstream.

According to a third aspect, there is provided an apparatus comprising at least one processor, memory including computer program code, the memory and the computer program code configured to, with the at least one processor, cause the apparatus to perform at least the following: receive a sequence of pictures to be encoded; define a refresh period for coded pictures, the refresh period being from a random access point picture, inclusive, to a recovery point picture, exclusive, wherein the decoded recovery point picture and all subsequent decoded pictures in output order are correct in content when starting decoding from the random access point picture; encode a picture within the refresh period, the picture comprising a refreshed area and unrefreshed area, wherein the encoding is constrained in a manner that the decoded refreshed area is correct in content when starting decoding from the random access point picture, and the apparatus is further caused to: determine the size of the refreshed area; select a number of sample columns or rows outside a conformance cropping window so that a boundary between the refreshed area and the unrefreshed area of the picture is aligned with a coding tree unit boundary, wherein a coding tree unit is characterized in one or both of: one or more prediction processes are disabled across the coding tree unit boundary; the coding tree unit is a root unit for partitioning into coding blocks or transform blocks; indicate the selected number in or along the bitstream.

According to a fourth aspect, there is provided computer program product comprising computer program code configured to, when executed on at least one processor, cause an apparatus or a system to: receive a sequence of pictures to be encoded; define a refresh period for coded pictures, the refresh period being from a random access point picture, inclusive, to a recovery point picture, exclusive, wherein the decoded recovery point picture and all subsequent decoded pictures in output order are correct in content when starting decoding from the random access point picture; encode a picture within the refresh period, the picture comprising a refreshed area and unrefreshed area, wherein the encoding is constrained in a manner that the decoded refreshed area is correct in content when starting decoding from the random access point picture, and the apparatus or system is further caused to: determine the size of the refreshed area; select a number of sample columns or rows outside a conformance cropping window so that a boundary between the refreshed area and the unrefreshed area of the picture is aligned with a coding tree unit boundary, wherein a coding tree unit is characterized in one or both of: one or more prediction processes are disabled across the coding tree unit boundary; the coding tree unit is a root unit for partitioning into coding blocks or transform blocks; indicate the selected number in or along the bitstream.

According to an embodiment, a tile column boundary or tile row boundary is inserted between unrefreshed and refresh areas.

According to an embodiment, a slice boundary is inserted between unrefreshed and refreshed areas.

According to an embodiment, the refreshed area is encoded as a first rectangular slice and the unrefreshed area is encoded as a second rectangular slice.

According to an embodiment, first one or more complete raster-scan slices covering the refreshed area are encoded, and second one or more complete raster-scan slices covering the unrefreshed area are encoded.

According to an embodiment, the computer program product is embodied on a non-transitory computer readable medium.

DESCRIPTION OF THE DRAWINGS

In the following, various embodiments will be described in more detail with reference to the appended drawings, in which.

DESCRIPTION OF EXAMPLE EMBODIMENTS

Figure 1:
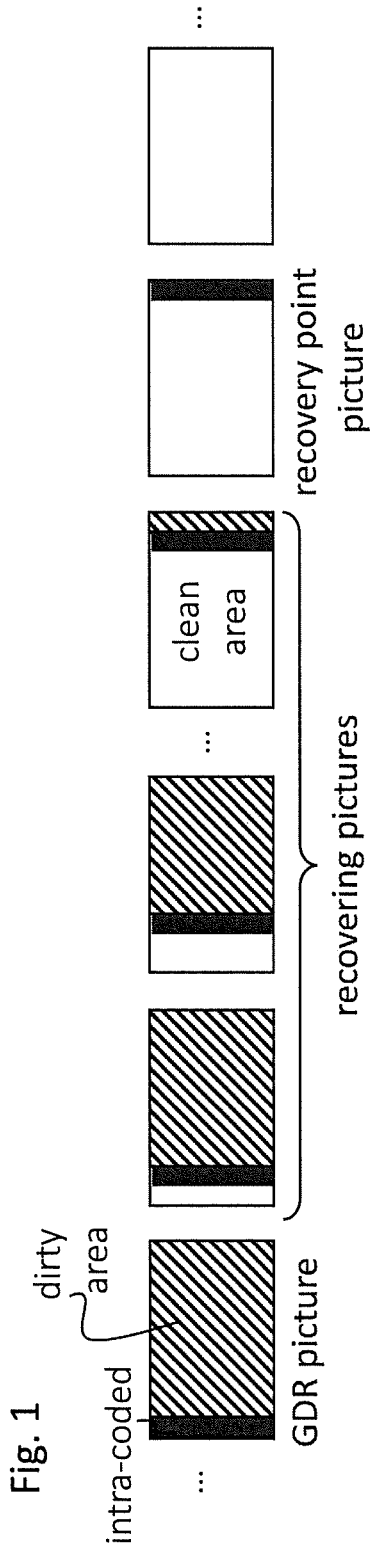
FIG. 1 shows an example of a vertical Gradual Decoding Refresh (GDR)

The following description and drawings are illustrative and are not to be construed as unnecessarily limiting. The specific details are provided for a thorough understanding of the disclosure. However, in certain instances, well-known or conventional details are not described in order to avoid obscuring the description. References to one or an embodiment in the present disclosure can be, but not necessarily are, reference to the same embodiment and such references mean at least one of the embodiments.

Reference in this specification to "one embodiment" or "an embodiment" means that a particular feature, structure, or characteristic described in connection with the embodiment in included in at least one embodiment of the disclosure.

In the following, several embodiments will be described in the context of one video coding arrangement. It is to be noted, however, that the present embodiments are not necessarily limited to this particular arrangement. The embodiments relate to a fine-grained gradual decoding refresh with CTU-aligned boundary between clean and dirty areas of a picture.

The Advanced Video Coding standard (which may be abbreviated AVC or H.264/AVC) was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organization for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, each integrating new extensions or features to the specification. These extensions include Scalable Video Coding (SVC) and Multiview Video Coding (MVC).

The High Efficiency Video Coding standard (which may be abbreviated HEVC or H.265/HEVC) was developed by the Joint Collaborative Team-Video Coding (JCT-VC) of VCEG and MPEG. The standard is published by both parent standardization organizations, and it is referred to as ITU-T Recommendation H.265 and ISO/IEC International Standard 23008-2, also known as MPEG-H Part 2 High Efficiency Video Coding (HEVC). Extensions to H.265/HEVC include scalable, multiview, three-dimensional, and fidelity range extensions, which may be referred to as SHVC, MV-HEVC, 3D-HEVC, and REXT, respectively. The references in this description to H.265/HEVC, SHVC, MV-HEVC, 3D-HEVC and REXT that have been made for the purpose of understanding definitions, structures or concepts of these standard specifications are to be understood to be references to the latest versions of these standards that were available before the date of this application, unless otherwise indicated.

Versatile Video Coding (which may be abbreviated VVC, H.266, or H.266/VVC) is a video compression standard developed as the successor to HEVC. VVC is specified in ITU-T Recommendation 11.266 and equivalently in ISO/IEC 23090-3, which is also referred to as MPEG-I Part 3.

A specification of the AV1 bitstream format and decoding process were developed by the Alliance of Open Media (AOM). The AV1 specification was published in 2018. AOM is reportedly working on the AV2 specification.

Some key definitions, bitstream and coding structures, and concepts of H.264/AVC, HEVC, VVC, and/or AV1 and some of their extensions are described in this section as an example of a video encoder, decoder, encoding method, decoding method, and a bitstream structure, wherein the embodiments may be implemented. The aspects of various embodiments are not limited to H.264/AVC, HEVC, VVC, and/or AV1 or their extensions, but rather the description is given for one possible basis on top of which the present embodiments may be partly or fully realized.

A video codec may comprise an encoder that transforms the input video into a compressed representation suited for storage/transmission and a decoder that can uncompress the compressed video representation back into a viewable form. The compressed representation may be referred to as a bitstream or a video bitstream. A video encoder and/or a video decoder may also be separate from each other, i.e., need not form a codec. The encoder may discard some information in the original video sequence in order to represent the video in a more compact form (that is, at lower bitrate). The notation "(de)coder" means an encoder and/or a decoder.

Hybrid video codecs, for example ITU-T H.264, may encode the video information in two phases. At first, pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Then, the prediction error, i.e., the difference between the predicted block of pixels and the original block of pixels, is coded. This may be done by transforming the difference in pixel values using a specified transform (e.g., Discreet Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction or current picture referencing), prediction is applied similarly to temporal prediction, but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Intra prediction utilizes the fact that adjacent pixels within the same picture are likely to be correlated. Intra prediction can be performed in spatial or transform domain, i.e., either sample values or transform coefficients can be predicted. Intra prediction may be exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Entropy coding/decoding may be performed in many ways. For example, context-based coding/decoding may be applied, where in both the encoder and the decoder modify the context state of a coding parameter based on previously coded/decoded coding parameters. Context-based coding may for example be context adaptive binary arithmetic coding (CABAC) or context-based variable length coding (CAVLC) or any similar entropy coding. Entropy coding/decoding may alternatively or additionally be performed using a variable length coding scheme, such as Huffman coding/decoding or Exp-Golomb coding/decoding. Decoding of coding parameters from an entropy-coded bitstream or codewords may be referred to as parsing.

Video coding standards may specify the bitstream syntax and semantics as well as the decoding process for error-free bitstreams, whereas the encoding process might not be specified, but encoders may just be required to generate conforming bitstreams. Bitstream and decoder conformance can be verified with the Hypothetical Reference Decoder (HRD). The standards may contain coding tools that help in coping with transmission errors and losses, but the use of the tools in encoding may be optional and decoding process for erroneous bitstreams might not have been specified.

An elementary unit for the input to an encoder and the output of a decoder, respectively, in most cases is a picture. A picture given as an input to an encoder may also be referred to as a source picture, and a picture decoded by a decoded may be referred to as a decoded picture or a reconstructed picture.

The source and decoded pictures are each comprised of one or more sample arrays, such as one of the following sets of sample arrays:
  Luma (Y) only (monochrome).
  Luma and two chroma (YCbCr or YCgCo).
  Green, Blue and Red (GBR, also known as RGB).
  Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g., in a coded bitstream e.g., using the Video Usability Information (VUI) syntax of HEVC or alike. A component may be defined as an array or single sample from one of the three sample arrays (luma and two chroma) or the array or a single sample of the array that compose a picture in monochrome format.

A picture may be defined to be either a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays.

Some chroma formats may be summarized as follows:
  In monochrome sampling there is only one sample array, which may be nominally considered the luma array.
  In 4:2:0 sampling, each of the two chroma arrays has half the height and half the width of the luma array.
  In 4:2:2 sampling, each of the two chroma arrays has the same height and half the width of the luma array.
  In 4:4:4 sampling when no separate color planes are in use, each of the two chroma arrays has the same height and width as the luma array.

Coding formats or standards may allow to code sample arrays as separate color planes into the bitstream and respectively decode separately coded color planes from the bitstream. When separate color planes are in use, each one of them is separately processed (by the encoder and/or the decoder) as a picture with monochrome sampling.

When chroma subsampling is in use (e.g., 4:2:0 or 4:2:2 chroma sampling), the location of chroma samples with respect to luma samples may be determined in the encoder side (e.g., as pre-processing step or as part of encoding). The chroma sample positions with respect to luma sample positions may be pre-defined for example in a coding standard, such as H.264/AVC or HEVC, or may be indicated in the bitstream for example as part of VUI of H.264/AVC or HEVC.

Generally, the source video sequence(s) provided as input for encoding may either represent interlaced source content or progressive source content. Fields of opposite parity have been captured at different times for interlaced source content. Progressive source content contains captured frames. An encoder may encode fields of interlaced source content in two ways: a pair of interlaced fields may be coded into a coded frame, or a field may be coded as a coded field. Likewise, an encoder may encode frames of progressive source content in two ways: a frame of progressive source content may be coded into a coded frame or a pair of coded fields. A field pair or a complementary field pair may be defined as two fields next to each other in decoding and/or output order, having opposite parity (i.e., one being a top field and another being a bottom field) and neither belonging to any other complementary field pair. Some video coding standards or schemes allow mixing of coded frames and coded fields in the same coded video sequence. Moreover, predicting a coded field from a field in a coded frame and/or predicting a coded frame for a complementary field pair (coded as fields) may be enabled in encoding and/or decoding.

Partitioning may be defined as a division of a set into subsets such that each element of the set is in exactly one of the subsets.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples.

In some video codecs, such as High Efficiency Video Coding (HEVC) codec, video pictures may be divided into coding units (CU) covering the area of the picture. A CU consists of one or more prediction units (PU) defining the prediction process for the samples within the CU and one or more transform units (TU) defining the prediction error coding process for the samples in the said CU. The CU may consist of a square block of samples with a size selectable from a predefined set of possible CU sizes. A CU with the maximum allowed size may be named as LCU (largest coding unit) or coding tree unit (CTU) and the video picture is divided into non-overlapping LCUs. An LCU can be further split into a combination of smaller CUs, e.g., by recursively splitting the LCU and resultant CUs. Each resulting CU may have at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g., motion vector information for inter predicted PUs and intra prediction directionality information for intra predicted PUs).

Each TU can be associated with information describing the prediction error decoding process for the samples within the said TU (including e.g., DCT coefficient information). It may be signaled at CU level whether prediction error coding is applied or not for each CU. In the case there is no prediction error residual associated with the CU, it can be considered there are no TUs for the said CU. The division of the image into CUs, and division of CUs into PUs and TUs may be signaled in the bitstream allowing the decoder to reproduce the intended structure of these units.

In H.266VVC, the following block partitioning applies. Pictures are partitioned into CTUs similarly to HEVC, although the maximum CTU size has been increased to 128×128 (in luma samples). A CTU comprises either a coding tree block (CTB) of luma samples and two corresponding CTBs of chroma samples of a picture that has three sample arrays, or a CTB of samples of a monochrome picture, and syntax structures used to code the samples. The array size for each luma CTB in both width and height is CtbSizeY in units of samples. An encoder may select CtbSizeY on a sequence basis from values supported in the VVC standard (32, 64, 128), or the encoder may be configured to use a certain CtbSizeY value.

In VVC, each CTB is assigned a partition signalling to identify the block sizes for intra or inter prediction and for transform coding. The partitioning is a recursive quadtree partitioning. The root of the quadtree is associated with the CTB. The quadtree is split until a leaf is reached, which is referred to as the quadtree leaf. The root of the multi-type tree is associated with the quadtree leaf. The multi-type tree is split using horizontal or vertical binary splits or horizontal or vertical ternary splits until a leaf is reached, which is associated with the coding block. The coding block is the root node of the transform tree. The transform tree specifies the position and size of transform blocks. The splitting information for luma and chroma might or might not be identical for the transform tree. When the component width is not an integer number of the CTB size, the CTBs at the right component boundary are incomplete. When the component height is not an integer multiple of the CTB size, the CTBs at the bottom component boundary are incomplete.

In VVC, a transform block, a coding block, and a coding tree block as well as the associated syntax structures are grouped into transform unit, coding unit, and coding tree unit structures, respectively, as follows:

One transform block (monochrome picture) or three transform blocks (luma and chroma components of a picture in 4:2:0, 4:2:2 or 4:4:4 colour format) and the associated transform syntax structures units are associated with a transform unit (TU).

One coding block (monochrome picture) or three coding blocks (luma and chroma), the associated coding syntax structures and the associated transform units are associated with a coding unit (CU).

One CTB (monochrome picture) or three CTBs (luma and chroma), the associated coding tree syntax structures and the associated coding units are associated with a CTU.

A superblock in AV1 is similar to a CTU in VVC. A superblock may be regarded as the largest coding block that the AV1 specification supports. The size of the superblock is signaled in the sequence header to be 128×128 or 64×64 luma samples. A superblock may be partitioned into smaller coding blocks recursively. A coding block may have its own prediction and transform modes, independent of those of the other coding blocks.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF).

The deblocking loop filter may include multiple filtering modes or strengths, which may be adaptively selected based on the features of the blocks adjacent to the boundary, such as the quantization parameter value, and/or signaling included by the encoder in the bitstream. For example, the deblocking loop filter may comprise a normal filtering mode and a strong filtering mode, which may differ in terms of the number of filter taps (i.e., number of samples being filtered on both sides of the boundary) and/or the filter tap values. For example, filtering of two samples along both sides of the boundary may be performed with a filter having the impulse response of (3 7 9 −3)/16, when omitting the potential impact of a clipping operation.

The motion information may be indicated with motion vectors associated with each motion compensated image block in video codecs. Each of these motion vectors represents the displacement of the image block in the picture to be coded (in the encoder side) or decoded (in the decoder side) and the prediction source block in one of the previously coded or decoded pictures. In order to represent motion vectors efficiently those may be coded differentially with respect to block specific predicted motion vectors. The predicted motion vectors may be created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signaling the chosen candidate as the motion vector predictor. In addition to predicting the motion vector values, the reference index of previously coded/decoded picture can be predicted. The reference index may be predicted from adjacent blocks and/or co-located blocks in temporal reference picture. Moreover, high efficiency video codecs may employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signaled among a list of motion field candidate list filled with motion field information of available adjacent/co-located blocks.

Video codecs may support motion compensated prediction from one source image (uni-prediction) and two sources (bi-prediction). In the case of uni-prediction a single motion vector is applied whereas in the case of bi-prediction two motion vectors are signaled and the motion compensated predictions from two sources are averaged to create the final sample prediction. In the case of weighted prediction, the relative weights of the two predictions can be adjusted, or a signaled offset can be added to the prediction signal.

In addition to applying motion compensation for inter picture prediction, similar approach can be applied to intra picture prediction. In this case the displacement vector indicates where from the same picture a block of samples can be copied to form a prediction of the block to be coded or decoded. This kind of intra block copying methods can improve the coding efficiency substantially in presence of repeating structures within the frame—such as text or other graphics.

The prediction residual after motion compensation or intra prediction may be first transformed with a transform kernel (like DCT) and then coded. The reason for this is that often there still exists some correlation among the residual and transform can in many cases help reduce this correlation and provide more efficient coding.

Video encoders may utilize Lagrangian cost functions to find optimal coding modes, e.g., the desired Macroblock mode and associated motion vectors. This kind of cost function uses a weighting factor $\lambda$ to tie together the (exact or estimated) image distortion due to lossy coding methods and the (exact or estimated) amount of information that is required to represent the pixel values in an image area:

$$C=D+\lambda R \tag{Eq. 1}$$

where C is the Lagrangian cost to be minimized, D is the image distortion (e.g., Mean Squared Error) with the mode and motion vectors considered, and R the number of bits needed to represent the required data to reconstruct the image block in the decoder (including the amount of data to represent the candidate motion vectors).

Some codecs use a concept of picture order count (POC). A value of POC is derived for each picture and is non-decreasing with increasing picture position in output order. POC therefore indicates the output order of pictures. POC may be used in the decoding process for example for implicit scaling of motion vectors and for reference picture list initialization. Furthermore, POC may be used in the verification of output order conformance.

In video coding standards, a compliant bit stream must be able to be decoded by a hypothetical reference decoder that may be conceptually connected to the output of an encoder and consists of at least a pre-decoder buffer, a decoder and an output/display unit. This virtual decoder may be known as the hypothetical reference decoder (HRD) or the video buffering verifier (VBV). A stream is compliant if it can be decoded by the HRD without buffer overflow or, in some cases, underflow. Buffer overflow happens if more bits are to be placed into the buffer when it is full. Buffer underflow happens if some bits are not in the buffer when said bits are to be fetched from the buffer for decoding/playback. One of the motivations for the HRD is to avoid so-called evil bitstreams, which would consume such a large quantity of resources that practical decoder implementations would not be able to handle.

HRD models may include instantaneous decoding, while the input bitrate to the coded picture buffer (CPB) of HRD may be regarded as a constraint for the encoder and the bitstream on decoding rate of coded data and a requirement for decoders for the processing rate. An encoder may include a CPB as specified in the HRD for verifying and controlling that buffering constraints are obeyed in the encoding. A decoder implementation may also have a CPB that may but does not necessarily operate similarly or identically to the CPB specified for HRD.

A Decoded Picture Buffer (DPB) may be used in the encoder and/or in the decoder. There may be two reasons to buffer decoded pictures, for references in inter prediction and for reordering decoded pictures into output order. Some coding formats, such as HEVC, provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output. An HRD may also include a DPB. DPBs of an HRD and a decoder implementation may but do not need to operate identically.

Output order may be defined as the order in which the decoded pictures are output from the decoded picture buffer (for the decoded pictures that are to be output from the decoded picture buffer).

A decoder and/or an HRD may comprise a picture output process. The output process may be considered to be a process in which the decoder provides decoded and cropped pictures as the output of the decoding process. The output process may be a part of video coding standards, e.g., as a part of the hypothetical reference decoder specification. In output cropping, lines and/or columns of samples may be removed from decoded pictures according to a cropping rectangle to form output pictures. A cropped decoded picture may be defined as the result of cropping a decoded picture based on the conformance cropping window specified e.g., in the sequence parameter set that is referred to by the corresponding coded picture. Hence, it may be considered that the conformance cropping window specifies the cropping rectangle to form output pictures from decoded pictures.

One or more syntax structures for (decoded) reference picture marking may exist in a video coding system. An encoder generates an instance of a syntax structure e.g., in each coded picture, and a decoder decodes an instance of the syntax structure e.g., from each coded picture. For example, the decoding of the syntax structure may cause pictures to be adaptively marked as "used for reference" or "unused for reference".

A reference picture set (RPS) syntax structure of HEVC is an example of a syntax structure for reference picture marking. A reference picture set valid or active for a picture includes all the reference pictures that may be used as reference for the picture and all the reference pictures that are kept marked as "used for reference" for any subsequent pictures in decoding order. The reference pictures that are kept marked as "used for reference" for any subsequent pictures in decoding order but that are not used as reference picture for the current picture or image segment may be considered inactive. For example, they might not be included in the initial reference picture list(s).

In some coding formats and codecs, a distinction is made between so-called short-term and long-term reference pictures. This distinction may affect some decoding processes such as motion vector scaling. Syntax structure(s) for marking reference pictures may be indicative of marking a picture as "used for long-term reference" or "used for short-term reference".

In some coding formats, reference picture for inter prediction may be indicated with an index to a reference picture list. In some codecs, two reference picture lists (reference picture list 0 and reference picture list 1) are generated for each bi-predictive (B) slice, and one reference picture list (reference picture list 0) is formed for each inter-coded (P) slice.

A reference picture list, such as the reference picture list 0 and the reference picture list 1, may be constructed in two steps: First, an initial reference picture list is generated. The initial reference picture list may be generated using an algorithm pre-defined in a standard. Such an algorithm may use e.g., POC and/or temporal sub-layer, as the basis. The algorithm may process reference pictures with particular marking(s), such as "used for reference", and omit other reference pictures, i.e., avoid inserting other reference pictures into the initial reference picture list. An example of such other reference picture is a reference picture marked as "unused for reference" but still residing in the decoded picture buffer waiting to be output from the decoder. Second, the initial reference picture list may be reordered through a specific syntax structure, such as reference picture list reordering (RPLR) commands of H.264/AVC or reference picture list modification syntax structure of HEVC or anything alike. Furthermore, the number of active reference pictures may be indicated for each list, and the use of the pictures beyond the active ones in the list as reference for inter prediction is disabled. One or both the reference picture list initialization and reference picture list modification may process only active reference pictures among those reference pictures that are marked as "used for reference" or alike.

In reference picture resampling (RPR), which may also be called adaptive resolution change (ARC), the decoding process of a picture may refer to one or more previous reference pictures that have a different spatial resolution for inter prediction. Consequently, a resampling of the reference pictures for operation of the inter-picture prediction process may be applied. In general, resampling may be either picture-wise or block-wise. In picture-wise resampling, an entire reference picture is resampled, whereas in block-wise resampling, an area within a reference picture, such as a reference block for motion compensation, is resampled. The block-wise resampling may be performed as a part of the motion compensation process. Resampling may generally comprise downsampling and upsampling.

A scaling window may be signaled for and associated with a picture. Scaling windows of a picture and its reference picture may indicate the spatial correspondence between the pictures. Scaling windows may be used to achieve one or both of the following: i) a horizontal scaling ratio and a vertical scaling ratio may be derived based on the width ratio and the height ratio, respectively, of the scaling windows; ii) a left offset and a top offset for inter prediction may be derived. The horizontal and vertical scaling ratios may be used as resampling ratios for RPR. The left and top offsets may be used in deriving a spatial correspondence between a picture and its reference picture. The left and top offsets may be added in the reference picture location derivation through a motion vector scaled by a scaling ratio. For example, the top-left corner of the current block is mapped to the respective "anchor location" in the reference picture through the left and top offsets, and a motion vector scaled by a scaling ratio is then applied to obtain a reference block in relation to anchor location. In general, the scaling ratio may be 1:1, in which case the left and top offsets may be applied without resampling. It needs to be understood that there may be other means to signal scaling ratio(s), top offset, and/or left offset than scaling windows.

In VVC, a scaling window may be indicated in a PPS explicitly or implicitly. When indicated explicitly, pps_scaling_win_left_offset, pps_scaling_win_right_offset, pps_scaling_win_top_offset, and pps_scaling_win_bottom_offset specify the offsets of the scaling window boundaries relative to the left, right, top, and bottom boundaries of the conformance cropping window, respectively. When indicated implicitly, the scaling window is inferred to be identical to the conformance cropping window.

Scalable video coding refers to coding structure where one bitstream can contain multiple representations of the content at different bitrates, resolutions or frame rates. In these cases, the receiver can extract the desired representation depending on its characteristics (e.g., resolution that matches best the display device). Alternatively, a server or a network element can extract the portions of the bitstream to be transmitted to the receiver depending on e.g., the network characteristics or processing capabilities of the receiver. A scalable bitstream may include a "base layer" providing the lowest quality video available and one or more enhancement layers that enhance the video quality when received and decoded together with the lower layers. In order to improve coding efficiency for the enhancement layers, the coded representation of that layer may depend on the lower layers. E.g., the motion and mode information of the enhancement layer can be predicted from lower layers. Similarly, the pixel data of the lower layers can be used to create prediction for the enhancement layer.

A scalable video codec for quality scalability (also known as Signal-to-Noise or SNR) and/or spatial scalability may be implemented as follows. For a base layer, a conventional non-scalable video encoder and decoder is used. The reconstructed/decoded pictures of the base layer are included in the reference picture buffer for an enhancement layer. In H.264/AVC, HEVC, and similar codecs using reference picture list(s) for inter prediction, the base layer decoded pictures may be inserted into a reference picture list(s) for coding/decoding of an enhancement layer picture similarly to the decoded reference pictures of the enhancement layer. Consequently, the encoder may choose a base-layer reference picture as inter prediction reference and indicate its use e.g., with a reference picture index in the coded bitstream.

The decoder decodes from the bitstream, for example from a reference picture index, that a base-layer picture is used as inter prediction reference for the enhancement layer. When a decoded base-layer picture is used as prediction reference for an enhancement layer, it is referred to as an inter-layer reference picture.

Scalability modes or scalability dimensions may include but are not limited to the following:

Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer.

Spatial scalability: Base layer pictures are coded at a lower resolution (i.e., have fewer samples) than enhancement layer pictures. Spatial scalability and quality scalability may sometimes be considered the same type of scalability.

Bit-depth scalability: Base layer pictures are coded at lower bit-depth (e.g., 8 bits) than enhancement layer pictures (e.g., 10 or 12 bits).

Dynamic range scalability: Scalable layers represent a different dynamic range and/or images obtained using a different tone mapping function and/or a different optical transfer function.

Chroma format scalability: Base layer pictures provide lower spatial resolution in chroma sample arrays (e.g., coded in 4:2:0 chroma format) than enhancement layer pictures (e.g., 4:4:4 format).

Color gamut scalability: enhancement layer pictures have a richer/broader color representation range than that of the base layer pictures—for example the enhancement layer may have UHDTV (ITU-R BT.2020) color gamut and the base layer may have the ITU-R BT.709 color gamut.

Region-of-interest (ROI) scalability: An enhancement layer represents of spatial subset of the base layer. ROI scalability may be used together with other types of scalabilities, e.g., quality or spatial scalability so that the enhancement layer provides higher subjective quality for the spatial subset.

View scalability, which may also be referred to as multiview coding. The base layer represents a first view, whereas an enhancement layer represents a second view.

Depth scalability, which may also be referred to as depth-enhanced coding. A layer or some layers of a bitstream may represent texture view(s), while other layer or layers may represent depth view(s).

In all of the above scalability cases, base layer information could be used to code enhancement layer to minimize the additional bitrate overhead.

Scalability can be enabled in two basic ways. Either by introducing new coding modes for performing prediction of pixel values or syntax from lower layers of the scalable representation or by placing the lower layer pictures to the reference picture buffer (decoded picture buffer, DPB) of the higher layer. The first approach is more flexible and thus can provide better coding efficiency in most cases. However, the second, reference frame-based scalability, approach can be implemented very efficiently with minimal changes to single layer codecs while still achieving majority of the coding efficiency gains available. Essentially a reference frame-based scalability codec can be implemented by utilizing the same hardware or software implementation for all the layers, just taking care of the DPB management by external means.

Bitstreams or coded video sequences can be encoded to be temporally scalable as follows. Each picture may be assigned to a particular temporal sub-layer. A temporal sub-layer may be equivalently called a sub-layer, temporal sublayer, sublayer, or temporal level. Temporal sub-layers may be enumerated e.g., from 0 upwards. The lowest temporal sub-layer, sub-layer 0, may be decoded independently. Pictures at temporal sub-layer 1 may be predicted from reconstructed pictures at temporal sub-layers 0 and 1. Pictures at temporal sub-layer 2 may be predicted from reconstructed pictures at temporal sub-layers 0, 1, and 2, and so on. In other words, a picture at temporal sub-layer N does not use any picture at temporal sub-layer greater than N as a reference for inter prediction. The bitstream created by excluding all pictures greater than or equal to a selected sub-layer value and including pictures remains conforming.

A bitstream may be defined as a sequence of bits or a sequence of syntax structures. A bitstream format may constrain the order of syntax structures in the bitstream.

A syntax element may be defined as an element of data represented in the bitstream. A syntax structure may be defined as zero or more syntax elements present together in the bitstream in a specified order.

In some coding formats or standards, a bitstream may be in the form of a network abstraction layer (NAL) unit stream or a byte stream, that forms the representation of coded pictures and associated data forming one or more coded video sequences.

In some formats or standards, a first bitstream may be followed by a second bitstream in the same logical channel, such as in the same file or in the same connection of a communication protocol. An elementary stream (in the context of video coding) may be defined as a sequence of one or more bitstreams.

In some coding formats or standards, the end of a bitstream may be indicated by a specific NAL unit, which may be referred to as the end of bitstream (EOB) NAL unit and which is the last NAL unit of the bitstream.

An elementary unit for the output of encoders of some coding formats, such as H.264/AVC, HEVC, or VVC, and the input of decoders of some coding formats, such as H.264/AVC, HEVC, or VVC, is a Network Abstraction Layer (NAL) unit. For transport over packet-oriented networks or storage into structured files, NAL units may be encapsulated into packets or similar structures.

A NAL unit may be defined as a syntax structure containing an indication of the type of data to follow and bytes containing that data in the form of an RBSP interspersed as necessary with start code emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

A NAL unit comprises a header and a payload. The NAL unit header may indicate the type of the NAL unit among other things.

In HEVC, a two-byte NAL unit header is used for all specified NAL unit types, while in other codecs NAL unit header may be similar to that in HEVC.

In HEVC, the NAL unit header contains one reserved bit, a six-bit NAL unit type indication, a three-bit temporal_id_plus1 indication for temporal level or sub-layer (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1.

In some coding formats, such as AV1, a bitstream may comprise a sequence of open bitstream units (OBUs). An OBU comprises a header and a payload, wherein the header identifies a type of the OBU. Furthermore, the header may comprise a size of the payload in bytes.

Each picture of a temporally scalable bitstream may be assigned with a temporal identifier, which may be, for example, assigned to a variable TemporalId. The temporal identifier may, for example, be indicated in a NAL unit header or in an OBU extension header. TemporalId equal to 0 corresponds to the lowest temporal level. The bitstream created by excluding all coded pictures having a TemporalId greater than or equal to a selected value and including all other coded pictures remains conforming. Consequently, a picture having TemporalId equal to tid_value does not use any picture having a TemporalId greater than tid_value as a prediction reference.

NAL units can be categorized into Video Coding Layer (VCL) NAL units and non-VCL NAL units. VCL NAL units may be coded slice NAL units.

In HEVC, VCL NAL units contain syntax elements representing one or more CU. In HEVC, the NAL unit type within a certain range indicates a VCL NAL unit, and the VCL NAL unit type indicates a picture type.

Images can be split into independently codable and decodable image segments (e.g., slices or tiles or tile groups). Such image segments may enable parallel processing. Image segments may be coded as separate units in the bitstream, such as VCL NAL units in H.264/AVC, HEVC, and VVC. Coded image segments may comprise a header and a payload, wherein the header contains parameter values needed for decoding the payload.

In some video coding formats, such as HEVC and VVC, a picture is divided into one or more tile rows and one or more tile columns. A tile is a sequence of coding tree units (CTU) that covers a rectangular region of a picture. The partitioning to tiles forms a grid that may be characterized by a list of tile column widths (in CTUs) and a list of tile row heights (in CTUs). For encoding and/or decoding, the CTUs in a tile are scanned in raster scan order within that tile. In HEVC, tiles are ordered in the bitstream consecutively in the raster scan order of the tile grid.

In some video coding formats, such as AV1, a picture may be partitioned into tiles, and a tile consists of an integer number of complete superblocks that collectively form a complete rectangular region of a picture. In-picture prediction across tile boundaries is disabled. The minimum tile size is one superblock, and the maximum tile size in the presently specified levels in AV1 is 4096×2304 in terms of luma sample count. The picture is partitioned into a tile grid of one or more tile rows and one or more tile columns. The tile grid may be signaled in the picture header to have a uniform tile size or nonuniform tile size, where in the latter case the tile row heights and tile column widths are signaled. The superblocks in a tile are scanned in raster scan order within that tile.

In some video coding formats, such as VVC, a slice consists of an integer number of complete tiles or an integer number of consecutive complete CTU rows within a tile of a picture. Consequently, each vertical slice boundary is always also a vertical tile boundary. It is possible that a horizontal boundary of a slice is not a tile boundary but consists of horizontal CTU boundaries within a tile; this occurs when a tile is split into multiple rectangular slices, each of which consists of an integer number of consecutive complete CTU rows within the tile.

In some video coding formats, such as VVC, two modes of slices are supported, namely the raster-scan slice mode and the rectangular slice mode. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

In HEVC, a slice consists of an integer number of CTUs. The CTUs are scanned in the raster scan order of CTUs within tiles or within a picture, if tiles are not in use. A slice may contain an integer number of tiles, or a slice can be contained in a tile. Within a CTU, the CUs have a specific scan order.

In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL (Network Abstraction Layer) unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

In some video coding formats, such as AV1, a tile group OBU carries one or more complete tiles. The first and last tiles of in the tile group OBU may be indicated in the tile group OBU before the coded tile data. Tiles within a tile group OBU may appear in a tile raster scan of a picture.

In some video coding formats, such as VVC, a subpicture may be defined as a rectangular region of one or more slices within a picture, wherein the one or more slices are complete. Thus, a subpicture consists of one or more slices that collectively cover a rectangular region of a picture. Consequently, each subpicture boundary is also always a slice boundary, and each vertical subpicture boundary is always also a vertical tile boundary. The slices of a subpicture may be required to be rectangular slices. One or both of the following conditions may be required to be fulfilled for each subpicture and tile: i) all CTUs in a subpicture belong to the same tile; ii) All CTUs in a tile belong to the same subpicture.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Some coding formats specify parameter sets that may carry parameter values needed for the decoding or reconstruction of decoded pictures. A parameter may be defined as a syntax element of a parameter set. A parameter set may be defined as a syntax structure that contains parameters and that can be referred to from or activated by another syntax structure for example using an identifier.

A coding standard or specification may specify several types of parameter sets. Some types of parameter sets are briefly described in the following, but it needs to be understood that other types of parameter sets may exist and that embodiments may be applied but are not limited to the described types of parameter sets. A video parameter set (VPS) may include parameters that are common across multiple layers in a coded video sequence or describe relations between layers. Parameters that remain unchanged through a coded video sequence may be included in a sequence parameter set (SPS). In addition to the parameters that may be needed by the decoding process, the sequence parameter set may optionally contain video usability information (VUI), which includes parameters that may be important for buffering, picture output timing, rendering, and resource reservation. A picture parameter set (PPS) contains such parameters that are likely to be unchanged in several coded pictures. A picture parameter set may include parameters that can be referred to by the coded image segments of one or more coded pictures. A header parameter set (BPS) has been proposed to contain such parameters that may change on picture basis. In VVC, an Adaptation Parameter Set (APS) may comprise parameters for decoding processes of different types, such as adaptive loop filtering or luma mapping with chroma scaling (LMCS).

A parameter set may be activated when it is referenced e.g., through its identifier. For example, a header of an image segment, such as a slice header, may contain an identifier of the PPS that is activated for decoding the coded picture containing the image segment. A PPS may contain an identifier of the SPS that is activated, when the PPS is activated. An activation of a parameter set of a particular type may cause the deactivation of the previously active parameter set of the same type.

Instead of or in addition to parameter sets at different hierarchy levels (e.g., sequence and picture), video coding formats may include header syntax structures, such as a sequence header or a picture header.

A sequence header may precede any other data of the coded video sequence in the bitstream order. It may be allowed to repeat a sequence header in the bitstream, e.g., to provide a sequence header at a random access point.

A picture header may precede any coded video data for the picture in the bitstream order. A picture header may be interchangeably referred to as a frame header. Some video coding specifications may enable carriage of a picture header in a dedicated picture header NAL unit or a frame header OBU or alike. Some video coding specifications may enable carriage of a picture header in a NAL unit, OBU, or alike syntax structure that also contains coded picture data.

Video coding specifications may enable the use of supplemental enhancement information (SEI) messages, metadata syntax structures, or alike. An SEI message, a metadata syntax structure, or alike may not be required for the decoding of output pictures but may assist in related process(es), such as picture output timing, post-processing of decoded pictures, rendering, error detection, error concealment, and resource reservation.

Some video coding specifications include SEI network abstraction layer (NAL) units, and some video coding specifications contain both prefix SEI NAL units and suffix SEI NAL units, where the former type can start a picture unit or alike and the latter type can end a picture unit or alike. An SEI NAL unit contains one or more SEI messages. Several SEI messages are specified in H.264/AVC, H.265/HEVC, H.266VVC, and H.274/VSEI standards, and the user data SEI messages enable organizations and companies to specify SEI messages for their own use. The standards may contain the syntax and semantics for the specified SEI messages but a process for handling the messages in the recipient might not be defined. Consequently, encoders may be required to follow the standard specifying a SEI message when they create SEI message(s), and decoders might not be required to process SEI messages for output order conformance. One of the reasons to include the syntax and semantics of SEI messages in standards is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

Some video coding specifications enable metadata OBUs. A metadata OBU comprises a type field, which specifies the type of metadata.

The phrase along the bitstream (e.g., indicating along the bitstream) or along a coded unit of a bitstream (e.g., indicating along a coded tile) may be used in claims and described embodiments to refer to transmission, signaling, or storage in a manner that the "out-of-band" data is associated with but not included within the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively. For example, the phrase along the bitstream may be used when the bitstream is contained in a container file, such as a file conforming to the ISO Base Media File Format, and certain file metadata is stored in the file in a manner that associates the metadata to the bitstream, such as boxes in the sample entry for a track containing the bitstream, a sample group for the track containing the bitstream, or a timed metadata track associated with the track containing the bitstream.

A coded picture is a coded representation of a picture.

A random access point may be defined as a location within a bitstream where decoding can be started.

A Random Access Point (RAP) picture may be defined as a picture that serves as a random access point, i.e., as a picture where decoding can be started. In some contexts, the term random-access picture may be used interchangeably with the term RAP picture.

An intra random access point (IRAP) picture, when contained in a single-layer bitstream or an independent layer, may comprise only intra-coded image segments. Furthermore, an IRAP picture may constrain subsequence pictures in output order to be such that they can be correctly decoded without performing the decoding process of any pictures that precede the IRAP picture in decoding order.

Some specifications may define a key frame as an intra frame that resets the decoding process when it is shown. Hence, a key frame is similar to an IRAP picture contained in a single-layer bitstream or an independent layer.

In some contexts, an IRAP picture may be defined as one category of random-access pictures, characterized in that they contain only intra-coded image segments, whereas there may also be other category or categories of random-access pictures, such as a gradual decoding refresh (GDR) picture.

Some coding standards or specifications, such as H.264/AVC and H.265/HEVC, may use the NAL unit type of VCL NAL unit(s) of a picture to indicate a picture type. In H.266/VVC, the NAL unit type indicates a picture type when mixed VCL NAL unit types within a coded picture are disabled (pps_mixed_nalu_types_in_pic_flag is equal to 0 in the referenced PPS), while otherwise it indicates a subpicture type.

Some video coding standards or specifications define an access unit. An access unit may comprise coded video data for a single time instance and associated other data. For example, an access unit may comprise a set of coded pictures that belong to different layers and are associated with the same time for output from the DPB. An access unit may additionally comprise all non-VCL NAL units or alike associated to the set of coded pictures included in the access unit. In a single-layer bitstream, an access unit may comprise a single coded picture.

In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units. Said specified classification rule may for example associate pictures with the same output time or picture output count value into the same access unit.

It may be required that coded pictures appear in certain order within an access unit. For example, a coded picture with nuh_layer_id equal to nuhLayerIdA may be required to precede, in decoding order, all coded pictures with nuh_layer_id greater than nuhLayerIdA in the same access unit.

A coded video sequence (CVS) may be defined as such a sequence of coded pictures in decoding order that is independently decodable and is followed by another coded video sequence or the end of the bitstream.

Types and abbreviations for VCL NAL unit types may include one or more of the following: trailing (TRAIL), Temporal Sub-layer Access (TSA), Step-wise Temporal Sub-layer Access (STSA), Random Access Decodable Leading (RADL), Random Access Skipped Leading (RASL), Instantaneous Decoding Refresh (IDR), Clean Random Access (CRA), Gradual Decoding Refresh (GDR). When all VCL NAL units of a picture have the same NAL unit type, the types and abbreviations may be used as picture types, trailing picture (a.k.a. TRAIL picture).

Some VCL NAL unit types may be more fine-grained as indicated in the paragraph above. For example, two types of IDR pictures may be specified, IDR without leading pictures, IDR with random access decodable leading pictures (i.e., without RASL pictures).

A sub-layer access picture may be defined as a picture from which the decoding of a sub-layer can be started correctly, i.e., starting from which all pictures of the sub-layer can be correctly decoded. In HEVC there are two picture types, the temporal sub-layer access (TSA) and step-wise temporal sub-layer access (STSA) picture types, that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

Some coding standards or specifications may indicate a picture type in a picture header or a frame header or alike.

Available media file format standards include ISO base media file format (ISO/IEC 14496-12, which may be abbreviated ISOBMFF), MPEG-4 file format (ISO/IEC 14496-14, also known as the MP4 format), file format for NAL unit structured video (ISO/IEC 14496-15) and 3GPP file format (3GPP TS 26.244, also known as the 3GP format). The ISO file format is the base for derivation of all the above-mentioned file formats (excluding the ISO file format itself). These file formats (including the ISO file format itself) are generally called the ISO family of file formats.

According to at least some of the currently used video coding approaches, a coded video sequence may comprise intra coded pictures (i.e., I pictures) and inter coded pictures (e.g. P and B pictures). Intra coded pictures may use many more bits than inter coded pictures. Transmission time of such large (in size) intra coded pictures increases the encoder to decoder delay.

It is appreciated that intra coded picture are not suitable for (ultra) low delay applications because of the long encoder to decoder delay. However, random access points may be needed in a video bitstream, e.g., to enable starting decoding in the middle of a bitstream or for decoding recovery after a transmission error. Therefore, for (ultra) low delay applications, it may be desirable that both random access pictures and inter coded pictures have similar number of bits so that the encoder to decoder delay can be reduced to around 1 picture interval.

Gradual Decoding Refresh (GDR) often refers to the ability to start decoding at a non-IRAP picture and to recover decoded pictures that are correct in content after decoding a certain number of pictures. Said otherwise, GDR can be used to achieve random access from non-intra pictures. GDR, which is also known as Gradual random access (GRA) or Progressive Intra Refresh (PIR), alleviates the delay issue with ultra coded pictures. Instead of coding an intra picture at a random access point, GDR progressively refreshes pictures by spreading intra coded regions (groups of intra coded blocks) over several pictures.

A GDR picture may be defined as a random access picture that, when used to start the decoding process, enables recovery of exactly or approximately correct decoded pictures starting from a specific picture, known as the recovery point picture. It is possible to start decoding from a GDR picture.

In some video coding formats, such as VVC, all Video Coding Layer (VCL) Network Abstraction Layer (NAL) units of a GDR picture may have a particular NAL unit type value that indicates a GDR NAL unit.

In some video coding formats, an SEI message, a metadata OBU or alike with a particular type, such as a recovery point SEI message of HEVC, may be used to indicate a GDR picture and/or a recovery point picture.

A recovery point may be indicated within a GDR picture, e.g., as a picture order count (POC) difference compared to the POC of the GDR picture. When the decoding started from the GDR picture, the decoded recovery point picture and all subsequent decoded pictures in output order are correct in content.

Pictures between the GDR picture (exclusive) and the recovery point picture (exclusive), in decoding order, may be referred to as recovering pictures. Recovering pictures may be partially correct in content, when the decoding started from the GDR picture.

It may be allowed that the recovery point picture is the same picture as the GDR picture (and consequently there are no recovering pictures). In this case, there may be pictures that follow the GDR picture in decoding order and precede the GDR picture in output order that are not correctly decodable when the decoding is started from the GDR picture.

A GDR period (also referred to as "refresh period") may be defined, depending on the context, in one of the following ways:

A GDR period includes the recovering pictures, but excludes the GDR picture and the recovery point picture.

A GDR period includes the GDR picture and the recovering pictures, but excludes the recovery point picture.

A GDR period includes the GDR picture, the recovering pictures, and the recovery point picture.

The GDR picture and the recovering pictures may be considered to have at least two regions, a refreshed region (a.k.a. a clean region) and a "dirty" region. The refreshed region can be exactly or approximately correctly decoded when the decoding is started from the GDR picture, while the decoded "dirty" region might not be correct in content when the decoding is started from the GDR picture. A GDR picture may consist of a clean region and a dirty region, where the clean region may be intra-coded. Inter prediction used for encoding of a refreshed region in a recovering picture may be constrained so that the refreshed region may only inter-predicted from the refreshed region of the reference pictures within the same refresh period from the GDR picture to the recovery point picture, i.e., sample values of the "dirty" region are not used in inter prediction of the refreshed region. Since the refreshed region in a picture may be larger than the refreshed region in the previous pictures, the intra coding may be used for the coding block locations that are newly added in the refreshed region compared to the refreshed regions of earlier pictures in the same refresh period. In some implementations, a clean region in a recovering picture may comprise a forced intra-coded area for the coding block locations that are newly added in the refreshed region compared to the refreshed regions of earlier pictures in the same refresh period, while in other implementations, rate-distortion-optimized mode selection may be applied for the newly added coding block locations too as long as inter prediction constraints discussed above are obeyed.

FIG. 1 illustrates an example of a vertical GDR. The first picture within the GDR period is called a GDR picture. Forced intra coded areas (grey) gradually spread over consecutive pictures of the GDR period from the left to the right on a picture-by-picture basis. A white area represents clean area which is gradually expanded vertically from left to the right. The lined area represents a dirty area. The first picture when a picture is completely refreshed is called a recovery point picture.

A current picture within a GDR period may consist of a clean (also referred to as "refreshed") area and a dirty (also referred to as "unrefreshed") area, where the clean area may contain a forced intra area next to the dirty area for progressive intra refresh (PIR).

Some coding formats may require exact recovery, i.e., that the recovery point picture and any subsequent pictures, in decoding order, are identical regardless of which random picture the decoding has started from. This may also have a consequence that any refreshed region is exactly correctly decoded when the decoding is started from the random access point.

In VVC, in-loop filtering across a virtual boundary is disabled in the decoding process. A virtual boundary is a horizontal or vertical boundary across the picture. A virtual boundary may be specified in an SPS or a picture header. To avoid loop filtering causing a leak from the dirty area to the clean area, an encoder can insert a virtual boundary at the boundary between clean area and dirty area and signal the virtual boundary in the picture header.

It needs to be understood that the GDR period may or may not comprise consecutive pictures. For example, when several temporal sublayers are in use, the GDR period may only comprise pictures in the lowest temporal sublayer, while the pictures of the GDR period may be interleaved by pictures in other temporal sublayers, in decoding and/or output order.

Many video coding specifications require the encoding of the clean area to be constrained so that no parameters or sample values of the dirty area in the current picture or any reference picture are used for decoding the clean area. For example, encoding of the clean areas is constrained not to use any prediction from the dirty areas of the current picture and the reference pictures. For example, motion vectors are limited so that the prediction block for a coding unit or block in clean area only uses samples within the clean area in the reference picture. In another example, temporal motion vector candidates from dirty area are avoided.

A decoder and/or a hypothetical reference decoder (HRD) may comprise a picture output process. The output process may be considered to be a process in which the decoder provides decoded and cropped pictures as the output of the decoding process. The output process is typically a part of video coding standards, typically as a part of the hypothetical reference decoder specification. In output cropping, lines and/or columns of samples may be removed from decoded pictures according to a cropping rectangle to form output pictures. A cropped decoded picture may be defined as the result of cropping a decoded picture based on the conformance cropping window specified e.g., in the sequence parameter set or the picture parameter set that is referred to by the corresponding coded picture.

In VVC, pps_pic_width_in_luma_samples specifies the width of each decoded picture referring to the PPS in units of luma samples. pps_pic_height_in_luma_samples specifies the height of each decoded picture referring to the PPS in units of luma samples.

In VVC, pps_conf_win_left_offset, pps_conf_win_right_offset, pps_conf_win_top_offset, and pps_conf_win_bottom_offset specify the samples of the picture that are output from the decoding process, in terms of a rectangular region specified in picture coordinates for output.

pps_conf_win_left_offset indicates the number of sample columns outside the conformance cropping window at the left edge of the decoded picture.

pps_conf_win_right_offset indicates the number of sample columns outside the conformance cropping window at the right edge of the decoded picture.

pps_conf_win_top_offset indicates the number of sample columns outside the conformance cropping window at the top edge of the decoded picture.

pps_conf_win_bottom_offset indicates the number of sample columns outside the conformance cropping window at the bottom edge of the decoded picture.

In VVC, pps_conf_win_left_offset, pps_conf_win_right_offset, pps_conf_win_top_offset, and pps_conf_win_bottom_offset use a unit of a single luma sample in monochrome (4:0:0) and 4:4:4 chroma formats, a unit of 2 luma samples in the 4:2:0 chroma format, and a unit of 2 luma samples is used for pps_conf_win_left_offset and pps_conf_win_right_offset, and a unit of 1 luma sample for pps_conf_win_top_offset and pps_conf_win_bottom_offset in the 4:2:2 chroma format.

In VVC, the conformance cropping window implicitly sets the scaling window, and hence enables maintaining the correspondence of sample locations between the current picture and its reference pictures correctly.

History-based motion vector prediction (HMVP) may be summarized as follows. A list of HMVP candidates is derived by adding each coded motion vector into the list. If the list is fully occupied, the oldest HMVP candidate is removed from the list. HMVP candidate(s) may be inserted into the candidate lists for motion vector prediction, such as the merge mode in VVC.

Coding formats may enable a broader variety of prediction to be applied between CUs within a CTU compared to CUs in different CTUs. Consequently, when the boundary between clean and dirty areas of GDR is not aligned with a CTU boundary, the encoding may need to be further constrained, for example, in one or more of the following ways:

Block partitioning must be selected so that no coding unit crosses the boundary between clean and dirty areas.

Chroma residual scaling of LMCS has to be disabled. The chroma residual scaling process utilizes a reconstructed luma samples, which may originate from the dirty area if the boundary between clean and dirty areas of GDR is not aligned with a CTU boundary.

Spatial candidates, affine merge candidates and HMVP candidates originating from the dirty area need to be avoided.

Intra block copy from samples in the dirty area need to be avoided.

These encoding constraints are relatively complex, and the respective encoder implementation, such as source code in a software-based encoder implementation, may be substantial. The above-listed encoding limitations are not necessary and the respective encoder implementation for GDR is simpler, when the boundary between the clean and dirty areas is CTU-aligned. However, gradual decoding refresh with a CTU-aligned boundary between the clean and dirty areas is relatively coarse and may still cause a substantial bitrate variation due to a relatively large portion of the picture being intra-coded. It is remarked that if the encoder chose a smaller CTU size to achieve a fine-grained clean area evolution, the compression efficiency may be decreased compared to using a large CTU size, such as 128×128. Furthermore, even the smallest CTU size allowed by a coding specification may be relatively coarse for clean area evolution.

The present embodiments provide a solution that enables incrementing the clean area at granularity that is less than one CTU column wide or one CTU row high, while keeping the boundary between the clean and dirty areas CTU-aligned so that encoding limitations to achieve GDR are simpler.

The encoder according to present embodiments adjusts the conformance cropping window picture by picture within the GDR period in a way that the number of sample columns (or rows) that are outside the conformance cropping window are selected so that the boundary between the clean and dirty area is CTU-aligned.

According to an embodiment, an encoder encodes a GDR picture or a recovering picture within the refresh period. The GDR picture or the recovering picture comprises a refreshed area and unrefreshed area. The encoding is constrained in a manner that the decoded refreshed area is correct in content when starting decoding from the GDR picture. The encoding further comprises selecting a number of sample columns or rows outside a conformance cropping window so that a boundary between the refreshed area and the unrefreshed area of the GDR picture or recovering picture is aligned with a coding tree unit boundary.

Figure 2:
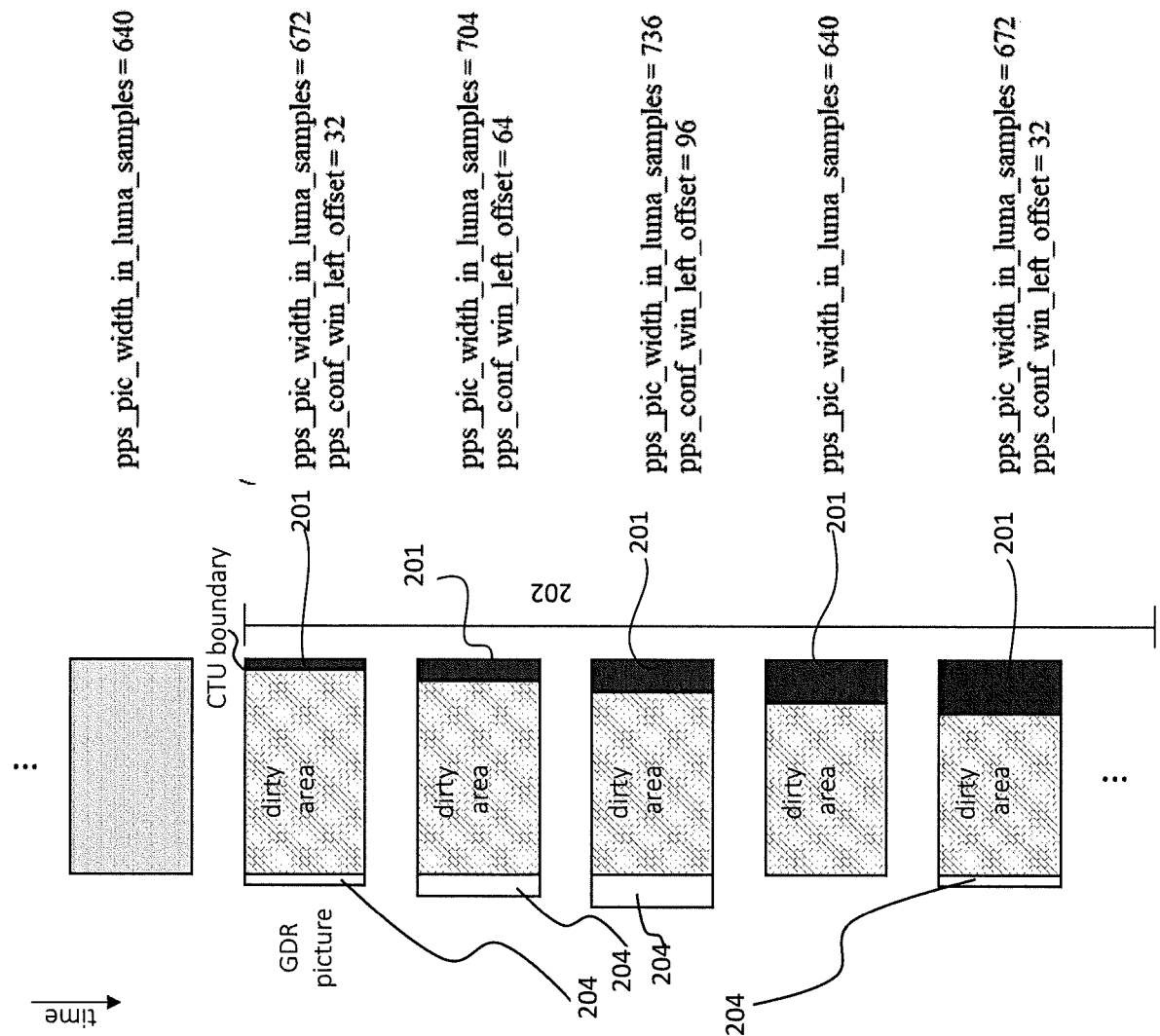
FIG. 2 shows an example according to an embodiment.

FIG. 2 illustrates an embodiment of the present solution. It is appreciated that the syntax element and parameter values in this embodiment, but also in other embodiments discussed in the present disclosure, are examples, presented without loss of generality and other values could likewise be used in embodiments. In the example of FIG. 2, the clean area 201 is increased by a column of 32 luma samples in each picture within the GDR period 202 which covers the pictures until a recovery point picture (not shown in FIG. 2). This may be signaled to a decoder with a picture parameter corresponding to current picture such as pps_pic_width_in_luma_samples parameter. As is shown in FIG. 2, the value of pps_pic_width_in_luma_samples increases picture by picture by a column of 32 luma samples. Similarly, the conformance cropping window is adjusted with a value that is an integer multiple of 32 luma samples.

In this embodiment and other embodiments, the encoder may use CTU size 128x128, and the input picture size for encoding is 640x360. In FIG. 2, the area outside the conformance cropping window 204 is illustrated with a white rectangle, the dirty area is illustrated with diagonally tiled rectangle, and the clean area 201 is illustrated with a solid grey rectangle. Generally, the clean area 201 in the GDR picture comprises only intra-coded blocks, whereas the clean area in the recovering pictures and in the recovery point picture may comprise intra-coded blocks and inter-coded blocks.

In the presented examples, values of pps_conf_win_left_offset, pps_conf_win_right_offset, pps_conf_win_top_offset, and pps_conf_win_bottom_offset, when present, are indicated in luma sample units, i.e., a value difference of 1 means one luma sample location. It needs to be understood that values of pps_conf_win_left_offset, pps_conf_win_right_offset, pps_conf_win_top_offset, and pps_conf_win_bottom_offset in the presented examples could be adjusted to be indicated in a unit of 2 luma samples (for the 4:2:0 chroma format). Similar adjustment could be made into a unit of 2 luma samples to be used for pps_conf_win_left_offset and pps_conf_win_right_offset, and into a unit of 1 luma sample for pps_conf_win_top_offset and pps_conf_win_bottom_offset in the 4:2:2 chroma format.

The area outside the conformance cropping window 204 may have any content and can be coded with the most rate-efficient manner without considering its distortion.

VVC has a constraint: "When sps_res_change_in_clvs_allowed_flag is equal to 1, the value of sps_virtual_boundaries_present_flag shall be equal to 0." If a virtual boundary is used in the boundary between dirty and clean areas, this constraint would need to be relaxed.

While the embodiment, shown in FIG. 2, has the benefits caused by a CTU-aligned boundary between the clean and dirty areas, it may have the following disadvantages:

The sample rate is increased, i.e., the (de)coder needs to process a greater number of samples per second.

Since the picture buffer memory is reserved based on the largest picture size in VVC, the memory usage for decoded picture buffering is increased.

The encoder needs to handle dynamic adjustment of the conformance cropping window and the scaling window inferred from the conformance cropping window.

In VVC, some tools (e.g., decoder-side motion vector refinement, DMVR, and bidirectional optical flow, BDOF) are implicitly disabled due to reference pictures having a different width than the current picture, hence reducing compression efficiency.

Picture parameter sets (PPSs) have to be updated or several PPSs are needed due to time-varying PPS syntax element values, hence increasing the bitrate.

Clean area evolution from left to right (see embodiment shown in FIG. 7), top to bottom (see embodiment shown in FIG. 8), and bottom to top can be realized similarly.

Figure 3:
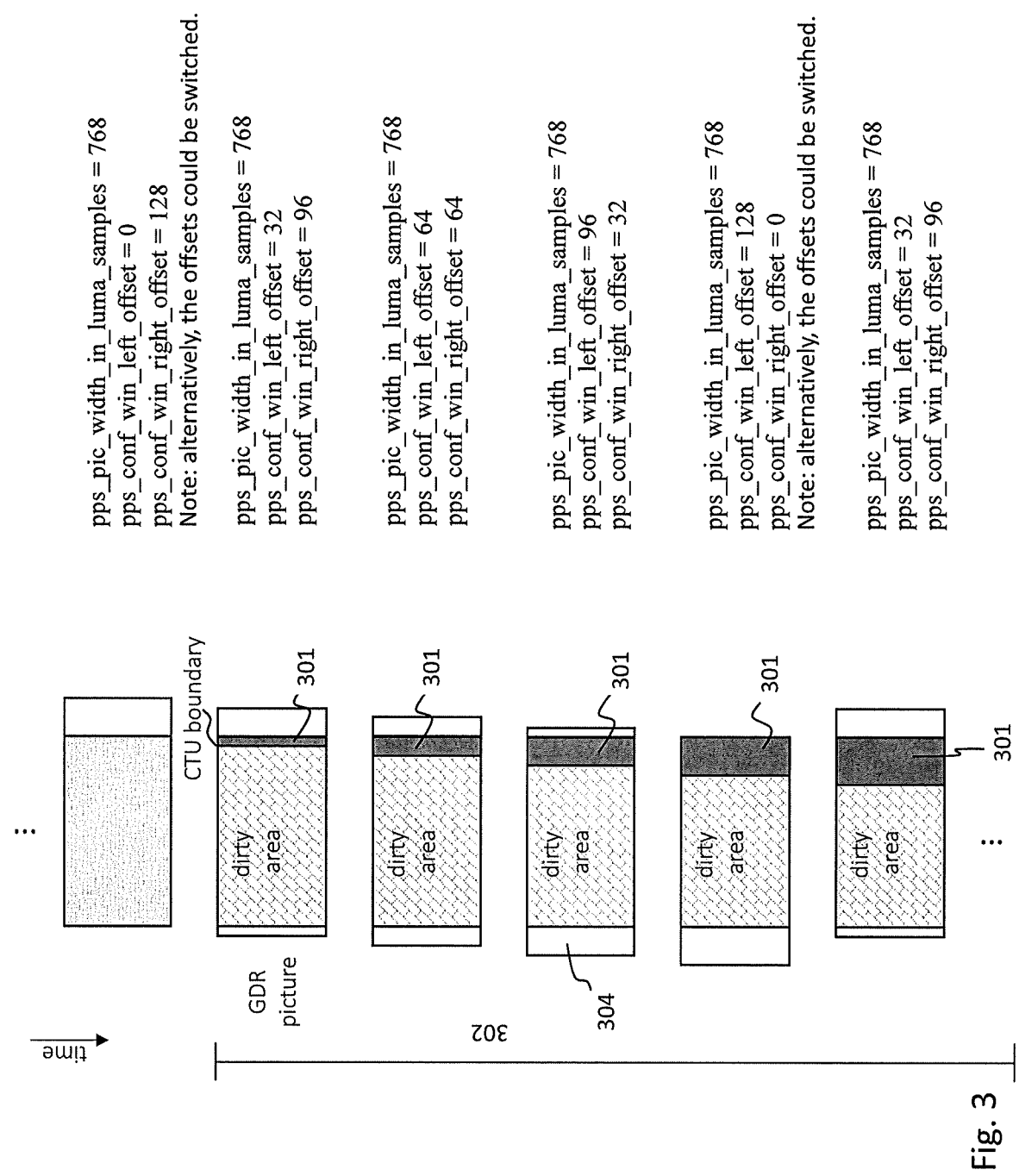
FIG. 3 shows an example according to another embodiment.

FIG. 3 illustrates another embodiment of the present solution. The embodiment shown in FIG. 3 resembles the embodiment shown in FIG. 2, but the width and height of the coded pictures remain constant. Clean areas are referred to with reference number 301, and an area outside the conformance cropping window is referred to with reference number 304. A GDR period 302 covers the pictures until a recovery point picture (not shown in the FIG. 3).

Even when a virtual boundary is used in the boundary between dirty and clean areas 302, the embodiment of FIG. 3 does not require a change to the VVC constraint: "When sps_res_change_in_clvs_allowed_flag is equal to 1, the value of sps_virtual_boundaries_present_flag shall be equal to 0." Consequently, the embodiment of FIG. 3 can be realized in a VVC encoder, and the bitstream created by a VVC encoder according to this embodiment conforms to the VVC standard.

Figure 4:
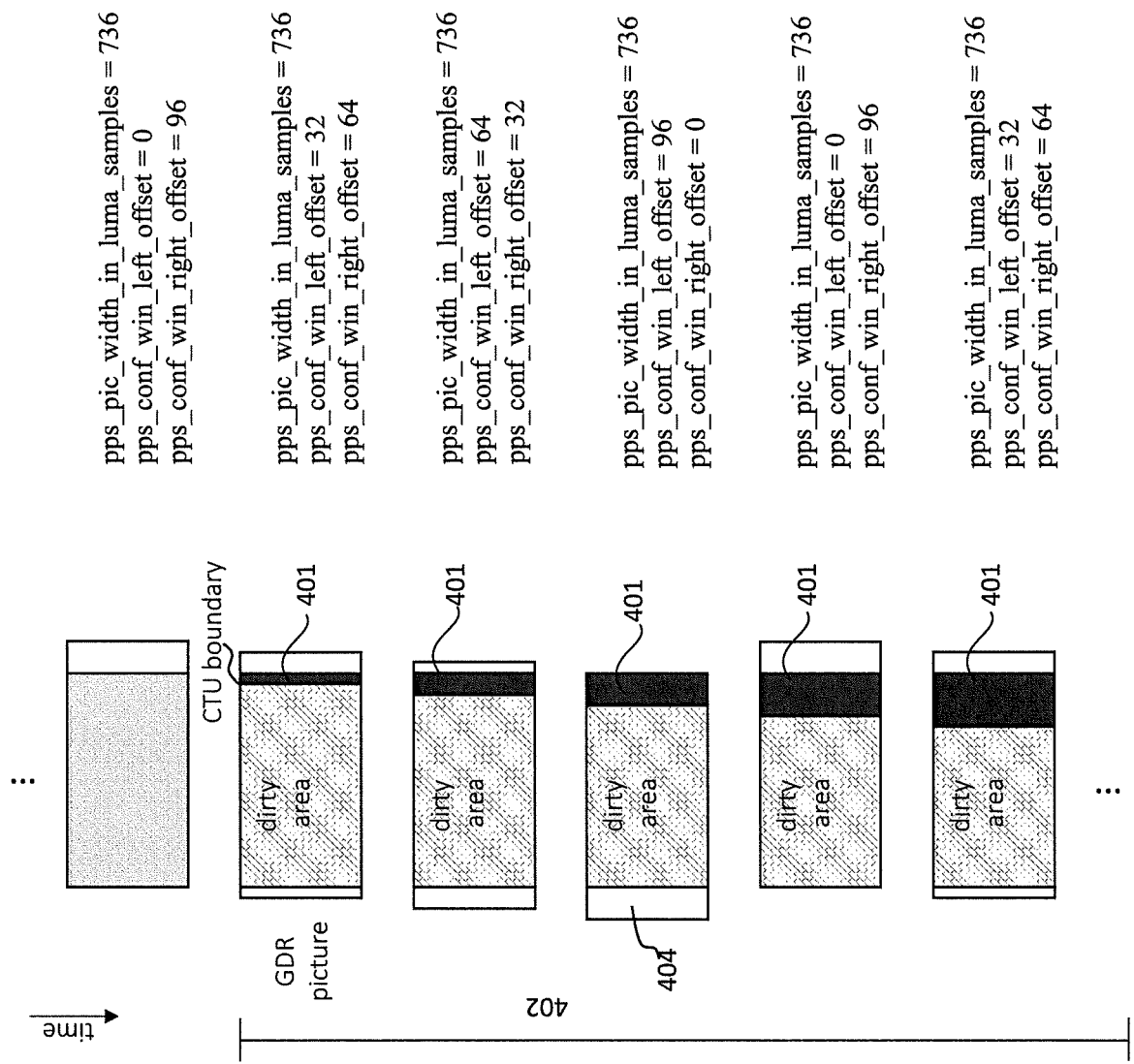
FIG. 4 shows an example according to yet another embodiment.

FIG. 4 illustrates yet another embodiment of the present solution. The embodiment of FIG. 4 is like the embodiment of FIG. 3, i.e., the width and height of the coded pictures remain constant. However, the right-most CTU column has a width less than the maximum CTU width, which is allowed in many video coding specifications, such as VVC. Thus, the sample rate of embodiment of FIG. 4 is less than that of embodiment of FIG. 3. Like the embodiment of FIG. 3, this embodiment of FIG. 4 can be realized in a VVC encoder that inserts a virtual boundary between dirty and clean 401 areas, and the bitstream created by a VVC encoder according to this embodiment conforms to the VVC standard. In FIG. 4, the area outside the conformance cropping window 404 is illustrated with a white rectangle, the dirty area is illustrated with diagonally tiled rectangle, and the clean area 401 is illustrated with a solid grey rectangle. In FIG. 4, a GDR period 402 covers the pictures until a recovery point picture (not shown in the FIG. 4).

Figure 5:
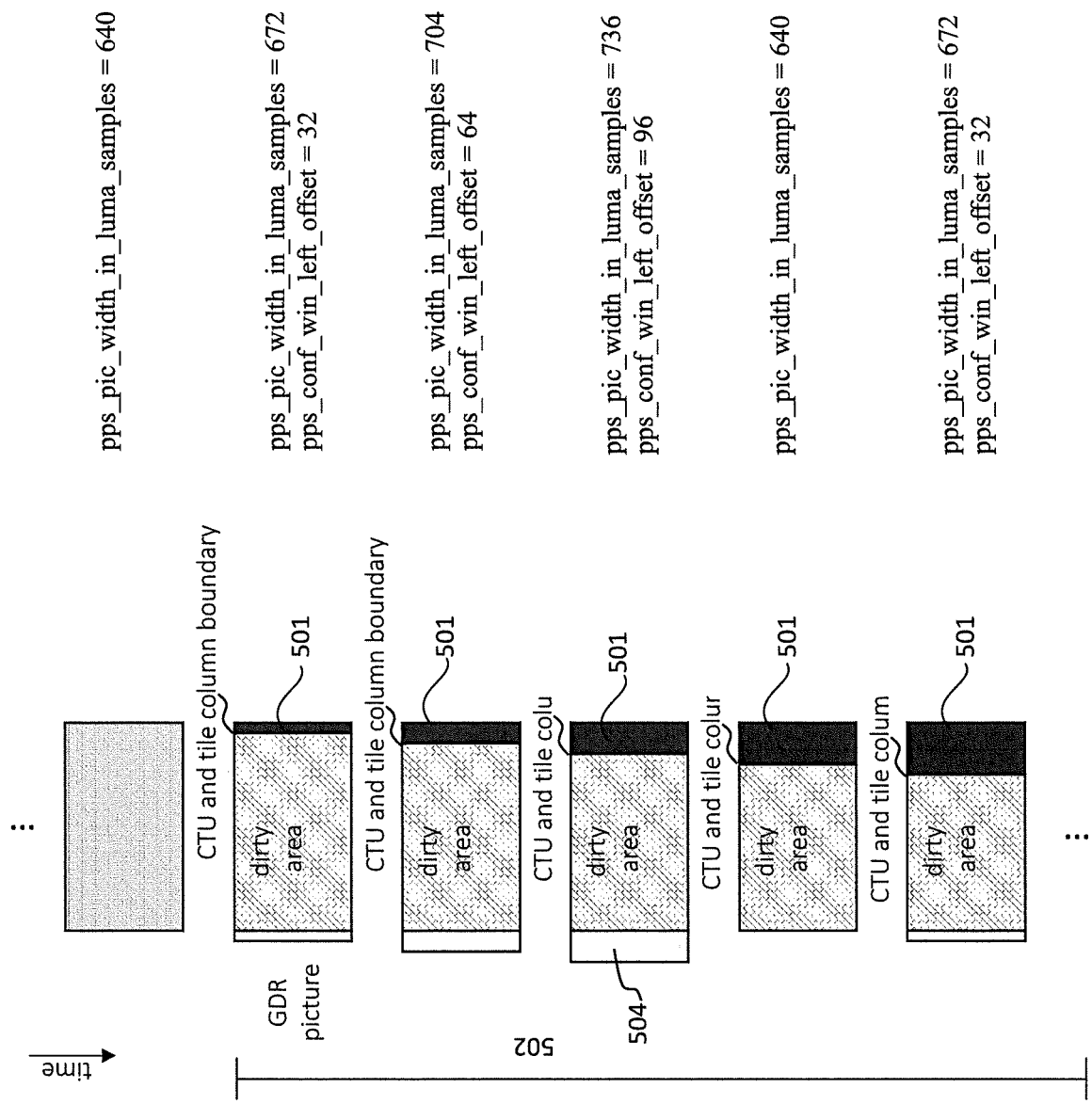
FIG. 5 shows an example according to yet another embodiment.

FIG. 5 illustrates yet another embodiment. Like in the embodiments of FIGS. 2 to 4, the clean area 501 is increased by a column of 32 luma samples in each picture within the GDR period 502, which covers the pictures until a recovery point picture (not shown in FIG. 5). The boundary between clean 501 and dirty areas is adjusted to be CTU-aligned through extra sample columns (or sample rows for top-to-bottom or bottom-to-top clean area evolution) that are outside the conformance cropping window 504 as described in embodiment show in FIG. 2, 3, or 4. In addition, the encoder inserts a tile column boundary (or a tile row boundary for top-to-bottom or bottom-to-top clean area evolution) between dirty and clean areas.

Rather than inserting a virtual boundary between the clean 501 and dirty areas, the encoder may disable loop filtering across tile boundaries. In VVC, disabling the loop filtering across tile boundaries may be indicated with pps_loop_filter_across_files_enabled_flag equal to 0.

An asserted additional benefit of the embodiment of FIG. 5 over those of embodiment of FIG. 2 is that the embodiment of FIG. 5 can be realized in a VVC encoder and the bitstream created by a VVC encoder according to the embodiment of FIG. 5 conforms to the VVC standard.

In an encoder implementation for GDR, some intra prediction modes need to be avoided. For example, angular intra modes causing prediction from reference samples across the boundary between clean and dirty areas are not selected. Since intra prediction does not take place over a tile boundary (or likewise a slice boundary), this embodiment does not require tailored handling of intra prediction for GDR.

Potential additional disadvantages of the embodiment of FIG. 5 beyond those of embodiment of FIG. 2 may comprise:

The need to insert a tile column/row boundary between the dirty and clean areas may interfere with how tile grid is determined for parallelization or other purposes.

When the encoder disables loop filtering across tile boundaries, loop filtering is not only disabled across the boundary between clean and dirty areas, but also across any other tile boundaries; hence there might be a visual impact and/or compression efficiency degradation when tiles are used for parallelization or other purposes beyond separating clean and dirty areas.

The clean area evolution from left to right, top to bottom, and bottom to top can be realized similarly.

Figure 6:
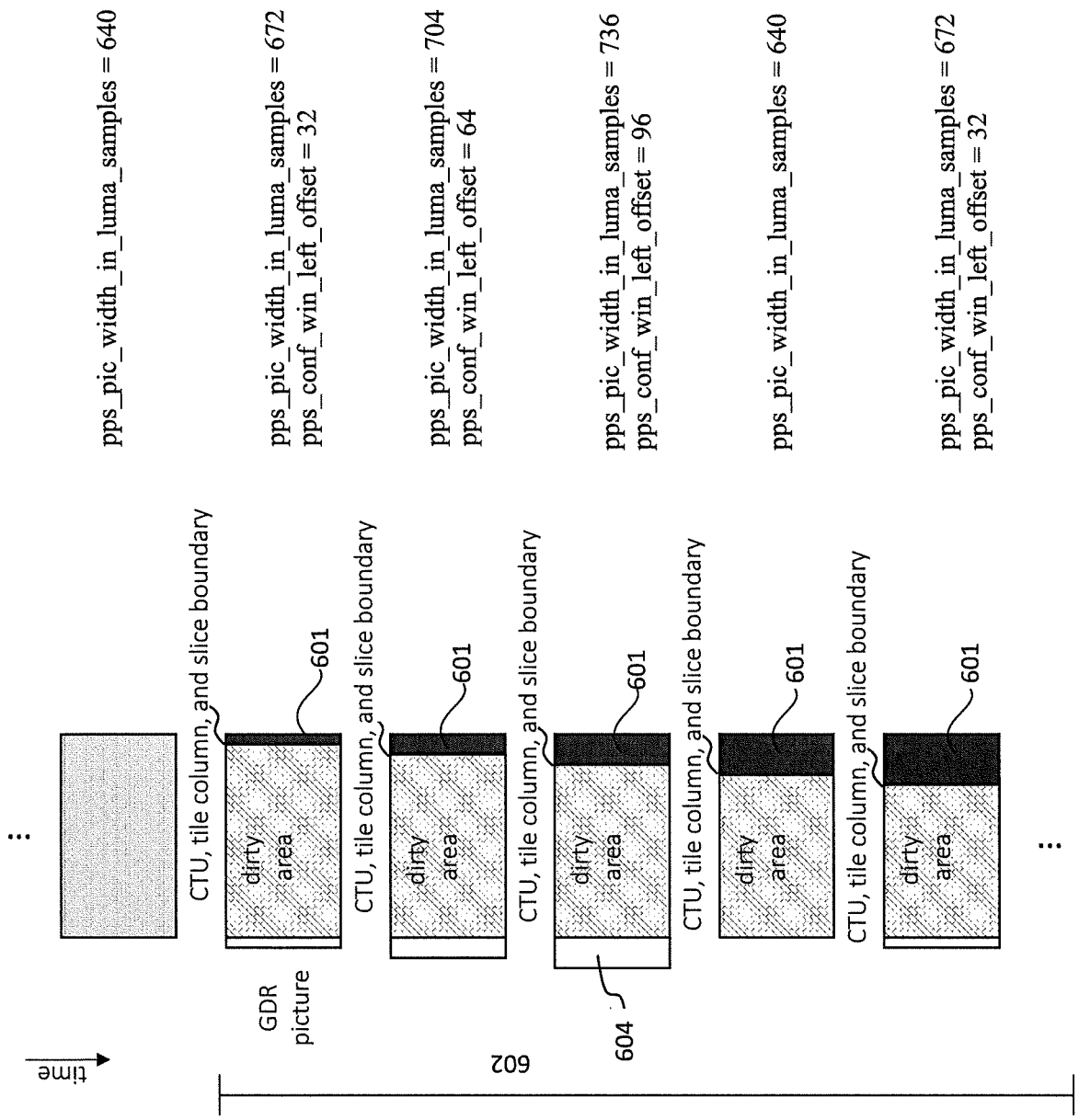
FIG. 6 shows an example according to yet another embodiment.

FIG. 6 illustrates yet another embodiment. The embodiment of FIG. 4 is like the embodiment of FIG. 5, but additionally the dirty area of a picture is enclosed in slice(s) separate from slice(s) enclosing the clean area 601 of the picture. Also in FIG. 6, the GDR period 602 covers the pictures until a recovery point picture (not shown in the FIG. 6).

Rectangular slices (i.e., pps_rect_slice_flag equal to 1 in VVC) may be used. Consequently, two slices per picture is sufficient, one slice for the dirty area (also including the area outside the conformance cropping window 604) and another slice for the clean area 601. In general, a clean area may be enclosed in one or more rectangular slices, and a dirty area may be enclosed in other one or more rectangular slices.

However, rectangular slices might not be suitable for some low-delay applications where slice size in bytes is adjusted for transmission. Raster-scan slices may be suitable for adjusting the slice size in bytes. However, if raster-scan slices are used, left-to-right or right-to-left clean area evolution would cause two slices per each CTU row, which causes bitrate increase due to a large number of slices (and the overhead caused by NAL unit headers and slice headers) and compression efficiency decreases since in-picture prediction is disabled over slice boundaries. Thus, for raster scan slices, top-to-bottom or bottom-to-top refreshing may be more suitable. For example, the embodiment of FIG. 6 can be used with embodiment of FIG. 8 that demonstrates top-to-bottom clean area evolution. When used with top-to-bottom or bottom-to-top refreshing, one or more complete raster-scan slices cover the clean area in each picture, and one or more complete raster-scan slices cover the dirty area in each picture.

Rather than inserting a virtual boundary between the clean and dirty areas or disabling loop filtering across tile boundaries, the encoder may disable loop filtering across slice boundaries. In VVC, disabling the loop filtering across tile boundaries may be indicated with pps_loop_filter_across_slices_enabled_flag equal to 0.

Asserted additional benefits of the embodiment of FIG. 6 over those of embodiment of FIG. 5 comprise:

An encoder may determine a tile grid that is suitable for parallelization, whereas the tile boundary that may be needed to have clean and dirty areas in different slices has only a minor impact on the flexibility of determining the tile grid.

If tiles are used for parallelization, this embodiment where loop filtering is turned off over slice boundaries causes loop filtering to be turned off over fewer boundaries than in embodiment of FIG. 5 where loop filtering is turned off over tile boundaries.

The dirty area and the clean area are encapsulated in different NAL units.

The clean area NAL units can be protected better, e.g., through forward error correction or retransmission.

When the decoding starts from a GDR picture, decoders may omit the decoding of the dirty area slices within the GDR period, thus saving computations. In addition, transmission of dirty area slices within the GDR period may be omitted, thus reducing the transmitted bitrate.

Like embodiment of FIG. 5, the embodiment of FIG. 6 does not require tailored handling of intra prediction for GDR.

A potential additional disadvantage of the embodiment of FIG. 6 beyond those of embodiment of FIG. 5 where a picture comprises a single slice only may be the byte count overhead caused by the NAL unit headers and the slice headers, since each picture comprises at least two slices. Moreover, VVC requires the picture header to be in its own NAL unit when there is more than one slice in a picture, causing a small overhead from the NAL unit header of the picture header.

In an embodiment, an encoder indicates, in or along a bitstream, either or both of: i) a first slice contains CTUs of a clean area only (i.e. contains no CTUs of a dirty area); ii) a second slice contains CTUs of a dirty area only (i.e. contains no CTUs of a clean area). In an embodiment, the indication(s) are included in slice header(s) of the first slice and/or the second slice. In an embodiment, the indication(s) are included in slice header(s) of the first slice and/or the second slice conditioned by the picture type or NAL unit type being indicative of a GDR picture. In an embodiment, the first slice in a GDR picture has a NAL unit type indicative of GDR and/or the second slice in a GDR picture has a NAL unit type that is not indicative of GDR and may, for example, be of type TRAIL. A picture header may indicate that the first slice and the second slice belong to a GDR picture.

In an embodiment, an encoder indicates in or along a bitstream, such as in an SEI message or in a metadata OBU, that slice-based GDR is in use, similarly to what has been described in relation to FIG. 6. In an embodiment, the SEI message or the metadata OBU or alike may indicate either or both of: i) a first slice contains CTUs of a clean area only (i.e. contains no CTUs of a dirty area); ii) a second slice contains CTUs of a dirty area only (i.e. contains no CTUs of a clean area). The first and/or second slices may be indicated in the SEI message or a metadata OBU or alike e.g., by a slice address syntax element with a value equal to the slice address syntax element value in the first and/or second slices, respectively.

In an embodiment, a decoder concludes or decodes that slice-based GDR is in use in a bitstream, similarly to what has been described in relation to FIG. 6.

In an embodiment, a decoder concludes that slice-based GDR is in use in a bitstream based on a first slice that contains only intra-coded CTUs and is present in a GDR picture. In an embodiment, a decoder concludes that slice-based GDR is in use in a bitstream based on a first slice that is indicated in its slice header to contain only intra-coded CTUs and is present in a GDR picture.

In an embodiment, a decoder decodes from or along a bitstream, such as from an SEI message or from a metadata OBU, that slice-based GDR is in use in a bitstream.

In response to concluding or decoding that slice-based GDR is in use in a bitstream, the following embodiments may be applied:

In an embodiment, a decoder concludes one or both of the following: i) a clean area is represented in a first slice that contains only intra-coded CTUs and is present in a GDR picture; ii) a dirty area is represented in a second slice that contains inter-coded CTUs and is present in a GDR picture.

In an embodiment, a decoder decodes indications of one or both of the following: i) a clean area is represented in a first slice that is present in a GDR picture; ii) a dirty area is represented in a second slice that is present in a GDR picture. The indications may be present in or along the bitstream, e.g., in NAL unit types of the first and second slices, in slice header(s) of the first and/or second slice(s), or in an SEI message or a metadata OBU.

In response to concluding or decoding that one or both of the following: i) a clean area is represented in a first slice that is present in a GDR picture; ii) a dirty area is represented in a second slice that is present in a GDR picture, the following embodiments may be applied for the recovering pictures:

In an embodiment, a decoder concludes one or both of the following: i) a clean area is represented in a first slice that covers the slice containing the clean area in a previous picture in the GDR period (e.g., the GDR picture); a dirty area is represented in a second slice that is covered by the slice containing the dirty area in a previous picture in the GDR period (e.g., the GDR picture). The conformance cropping window is considered to be applied when determining coverage.

In an embodiment, a decoder decodes indications of one or both of the following: i) a clean area is represented in a first slice that is present in a recovering picture; ii) a dirty area is represented in a second slice that is present in a recovering picture. The indications may be present in or along the bitstream, e.g., in slice header(s) of the first and/or second slice(s), or in an SEI message or a metadata OBU.

According to an embodiment, in response to concluding or decoding that a clean area is represented in a first slice that is present in a GDR picture or in a recovering picture, the decoder decodes the first slice of the GDR picture or the recovering picture and omits the decoding of other slices of the GDR picture or the recovering picture.

According to an embodiment, in response to concluding or decoding that a dirty area is represented in a second slice that is present in a GDR picture or in a recovering picture, the decoder omits the decoding of the second slice of the GDR picture or the recovering picture and decodes other slices of the GDR picture or the recovering picture.

According to an embodiment, in response to concluding or decoding that a clean area is represented in a first slice that is present in a GDR picture or in a recovering picture and a dirty area is represented in a second slice that is present in the GDR picture or in the recovering picture, the decoder decodes the first slice of the GDR picture or the recovering picture and omits the decoding of the second slice of the GDR picture or the recovering picture.

Figure 7:
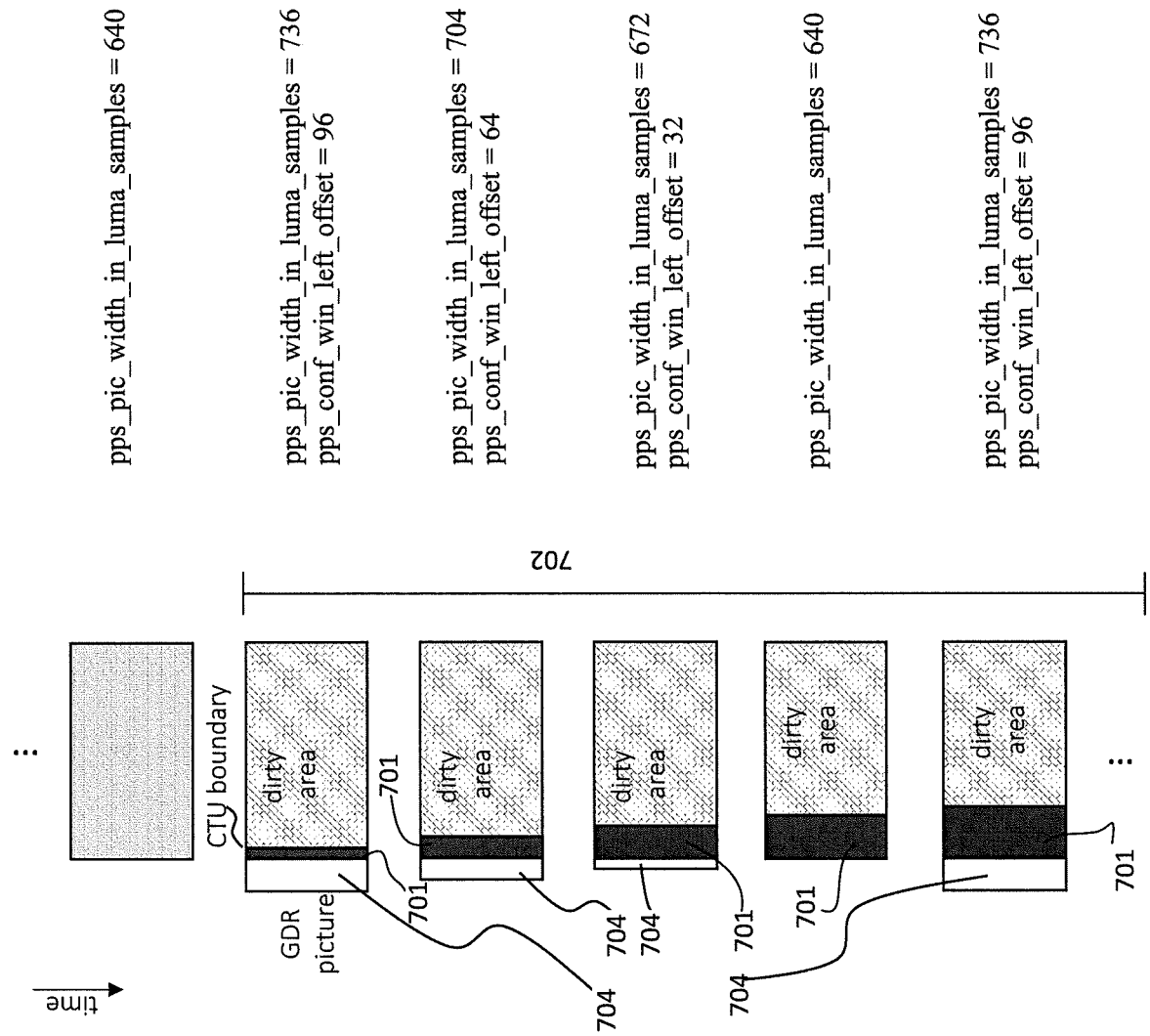
FIG. 7 shows an example according to yet another embodiment.

FIG. 7 shows yet another embodiment of the present solution. The embodiment of FIG. 7 is like the embodiment of FIG. 2, but the clean area 701 evolves from left to right within the GDR period 702 covering the pictures until a recovery point picture (not shown in the FIG. 7). In FIG. 7, the area outside the conformance cropping window 704 is illustrated with a white rectangle, the dirty area is illustrated with diagonally tiled rectangle, and the clean area 701 is illustrated with a solid grey rectangle.

Figure 8:
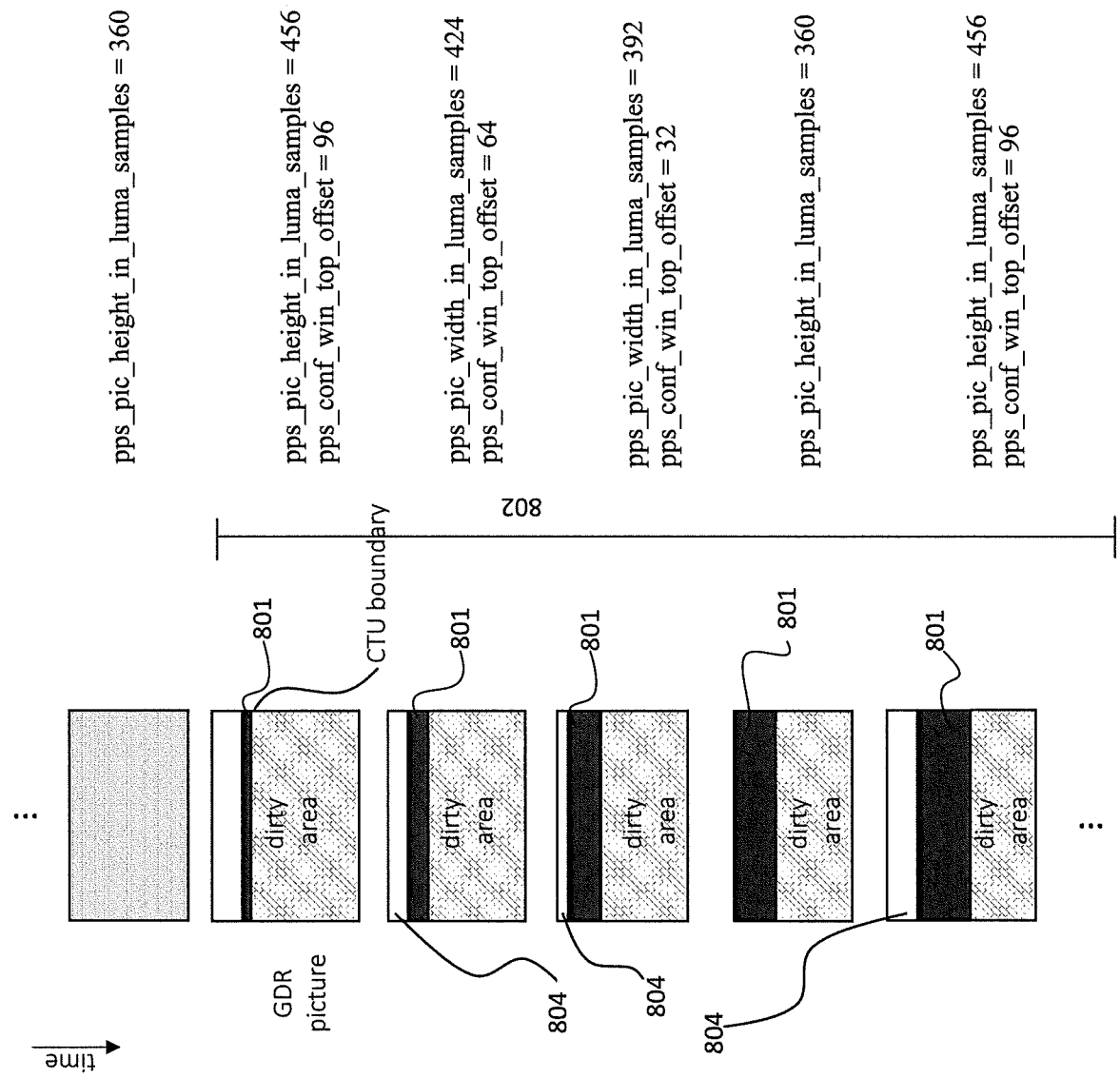
FIG. 8 shows an example according to yet another embodiment.

FIG. 8 illustrates yet another embodiment of the present solution. The embodiment of FIG. 8 is like the embodiment of FIG. 2, but the clean area 801 evolves from top to bottom within the GDR period 802 covering the pictures until a recovery point picture (not shown in FIG. 8). In FIG. 8, the area outside the conformance cropping window 804 is illustrated with a white rectangle, the dirty area is illustrated with diagonally tiled rectangle, and the clean area 801 is illustrated with a solid grey rectangle.

In some embodiments, gradual decoding refresh might not be horizontal or vertical, but it may have another pattern, such as diagonal. For example, a clean area may gradually grow from the top-left, top-right, bottom-left, or bottom-right corner towards to opposite corner of a conformance cropping window. According to an embodiment, a clean area in a GDR picture or a recovering picture occupies a rectangular area in a top-left, top-right, bottom-left, or bottom-right corner within a conformance cropping window. In other words, a clean area is separated from a dirty area through a horizontal boundary and a vertical boundary. According to an embodiment, a dirty area in a GDR picture or a recovering picture occupies a rectangular area in a top-left, top-right, bottom-left, or bottom-right corner within a conformance cropping window. In other words, a clean area is separated from a dirty area through a horizontal boundary and a vertical boundary.

Embodiments presented for a single vertical or horizontal boundary between the clean and dirty areas apply similarly when there are both a vertical boundary and a horizontal boundary between the clean and dirty areas. An encoder may adjust the conformance cropping window in left, right, top, and/or bottom boundaries of the picture to adjust both the horizontal and vertical boundaries between the clean and dirty areas to be aligned with CTU boundaries. For example, embodiments described with FIGS. 7 and 8 could be combined to obtain a clean area that grows, during the GDR period, from the top-left corner of the conformance cropping window towards the bottom-right corner. Embodiments using virtual boundaries, tiles, or slices may be applied when there are both a vertical boundary and a horizontal boundary between the clean and dirty areas. For example, two virtual boundaries may be used, one for the vertical boundary and another one for the horizontal boundary between the clean and dirty areas. In another example, a rectangular clean area or a rectangular dirty area may be is enclosed in a single tile or a single slice, whereas a non-rectangular clean area or a non-rectangular dirty area may be enclosed in a set of complete tiles or a set of one or more complete slices.

According to an embodiment, virtual boundaries, tile boundaries, or slice boundaries may be treated similarly to "picture boundaries" for CUs in clean area. One or more of the following may be applied for inter CUs in clean area.

The reconstructed pixels in dirty area of reference pictures are considered as "not available", and if needed, they are padded from the reconstructed pixels in clean area (or set to a pre-determined value, e.g. $2^{BD-1}$, where BD is bit depth), which will give predictions of CUs in clean area more freedom over the reference pictures, instead of being limited to the clean areas of reference pictures.

The coding information in dirty areas of reference pictures are considered "not available" or "not inter mode", which will prevent CUs in clean area from using the coding information in dirty areas of reference pictures.

For embodiments of the present invention where CUs of the clean area may appear in the same tile as CUs of the dirty area, coding information in dirty area of current picture are also considered "not available", which will prevent inter modes (e.g., merge mode, AMVP, HMVP, affine), and other possible modes (e.g., IBC merge and IBC HMVP) from using coding information in dirty areas of current picture.

In some embodiments, in-loop filtering across the boundary between the dirty area and the clean area is controlled as follows.

For pixels on the dirty-area side of the boundary, in-loop filters are enabled normally, as there was no boundary. In-loop filters are allowed to use the coding information (e.g., recon pixels, code mode, refIdx, MVs, etc.) in both the clean and dirty areas.

For pixels on the clean-area side of the boundary, in-loop filters are also enabled, but in-loop filters are not allowed to use the coding information in the dirty area. The coding information in dirty area are considered as "not available" and when needed, they are padded (or derived) from the clean area or pre-set.

Figure 9:
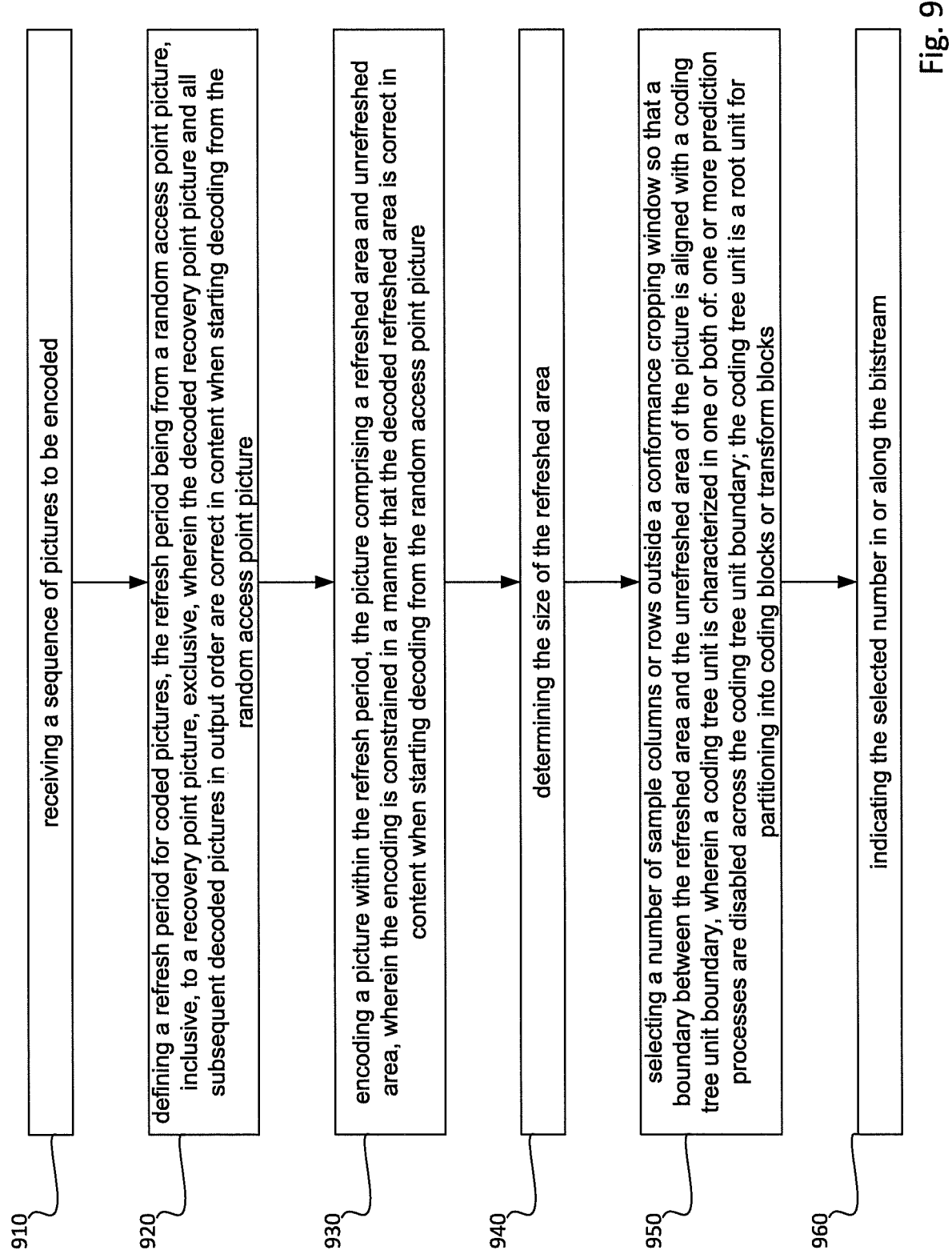
FIG. 9 is a flowchart illustrating a method according to an embodiment.

The method according to an embodiment is shown in FIG. 9. The method generally comprises receiving 910 a sequence of pictures to be encoded; defining 920 a refresh period for coded pictures, the refresh period being from a random access point picture, inclusive, to a recovery point picture, exclusive, wherein the decoded recovery point picture and all subsequent decoded pictures in output order are correct in content when starting decoding from the random access point picture; encoding 930 a picture within the refresh period, the picture comprising a refreshed area and unrefreshed area, wherein the encoding is constrained in a manner that the decoded refreshed area is correct in content when starting decoding from the random access point picture, and the encoding further comprises: determining 940 the size of the refreshed area; selecting 950 a number of sample columns or rows outside a conformance cropping window so that a boundary between the refreshed area and the unrefreshed area of the picture is aligned with a coding tree unit boundary, wherein a coding tree unit is characterized in one or both of: one or more prediction processes are disabled across the coding tree unit boundary; the coding tree unit is a root unit for partitioning into coding blocks or transform blocks; indicating 960 the selected number in or along the bitstream. Each of the steps can be implemented by a respective module of a computer system.

An apparatus according to an embodiment comprises means for receiving a sequence of pictures to be encoded; means for defining a refresh period for coded pictures, the refresh period being from a random access point picture, inclusive, to a recovery point picture, exclusive, wherein the decoded recovery point picture and all subsequent decoded pictures in output order are correct in content when starting decoding from the random access point picture; means for encoding a picture within the refresh period, the picture comprising a refreshed area and unrefreshed area, wherein the encoding is constrained in a manner that the decoded refreshed area is correct in content when starting decoding from the random access point picture, and the apparatus further comprises: means for determining the size of the refreshed area; means for selecting a number of sample columns or rows outside a conformance cropping window so that a boundary between the refreshed area and the unrefreshed area of the picture is aligned with a coding tree unit boundary, wherein a coding tree unit is characterized in one or both of: one or more prediction processes are disabled across the coding tree unit boundary; the coding tree unit is a root unit for partitioning into coding blocks or transform blocks; means for indicating the selected number in or along the bitstream. The means comprises at least one processor, and a memory including a computer program code, wherein the processor may further comprise processor circuitry. The memory and the computer program code are configured to, with the at least one processor, cause the apparatus to perform the method of FIG. 9 according to various embodiments.

Figure 10:
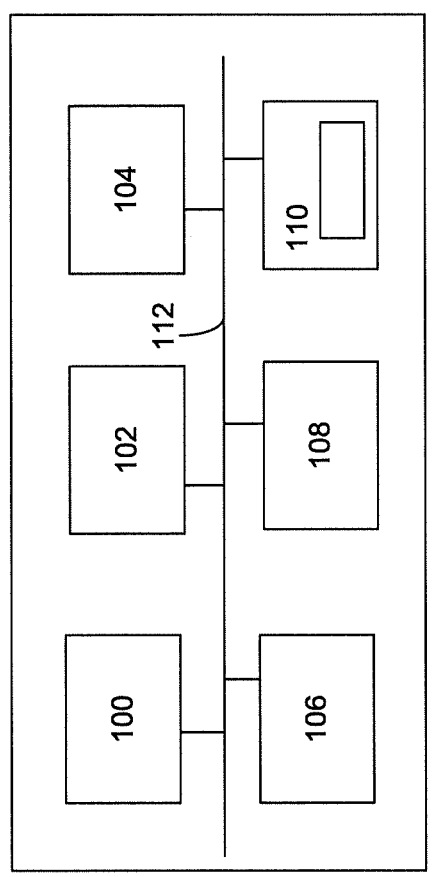
FIG. 10 shows an apparatus according to an embodiment.

An example of a data processing system for an apparatus is illustrated in FIG. 10. Several functionalities can be carried out with a single physical device, e.g., all calculation procedures can be performed in a single processor if desired. The data processing system comprises a main processing unit 100, a memory 102, a storage device 104, an input device 106, an output device 108, and a graphics subsystem 110, which are all connected to each other via a data bus 112.

The main processing unit 100 is a conventional processing unit arranged to process data within the data processing system. The main processing unit 100 may comprise or be implemented as one or more processors or processor circuitry. The memory 102, the storage device 104, the input device 106, and the output device 108 may include conventional components as recognized by those skilled in the art. The memory 102 and storage device 104 store data in the data processing system 100.

Computer program code resides in the memory 102 for implementing, for example a method as illustrated in a flowchart of FIG. 9 according to various embodiments. The input device 106 inputs data into the system while the output device 108 receives data from the data processing system and forwards the data, for example to a display. The data bus 112 is a conventional data bus and while shown as a single line it may be any combination of the following: a processor bus, a PCI bus, a graphical bus, an ISA bus. Accordingly, a skilled person readily recognizes that the apparatus may be any data processing device, such as a computer device, a personal computer, a server computer, a mobile phone, a smart phone or an Internet access device, for example Internet tablet computer.

Figure 11:
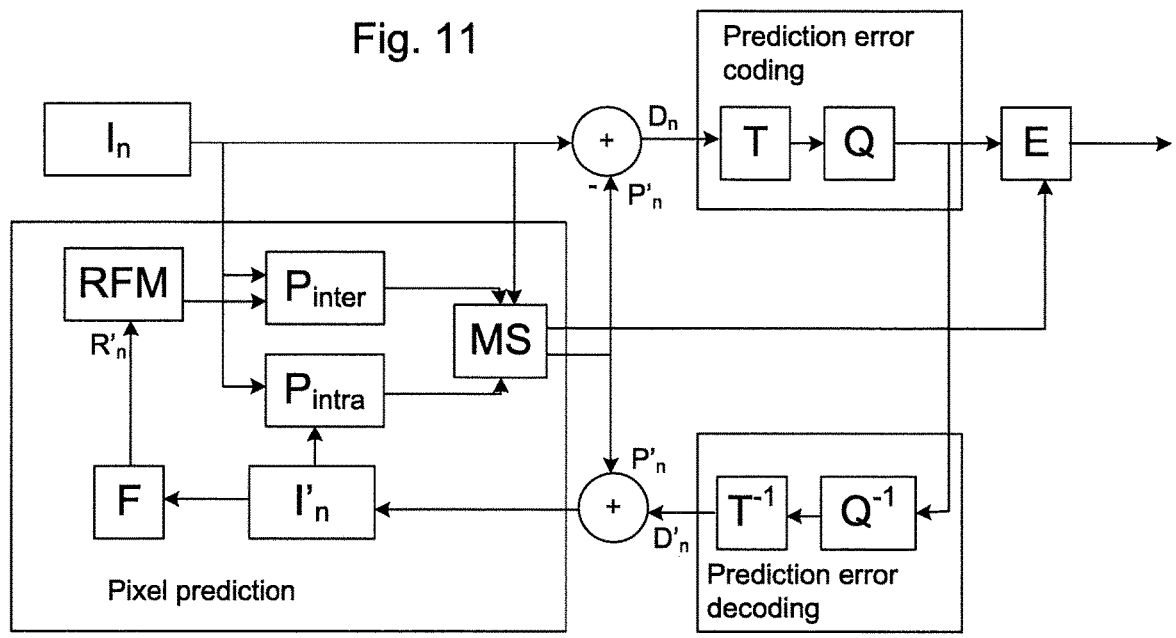
FIG. 11 shows an encoding process according to an embodiment.
Figure 12:
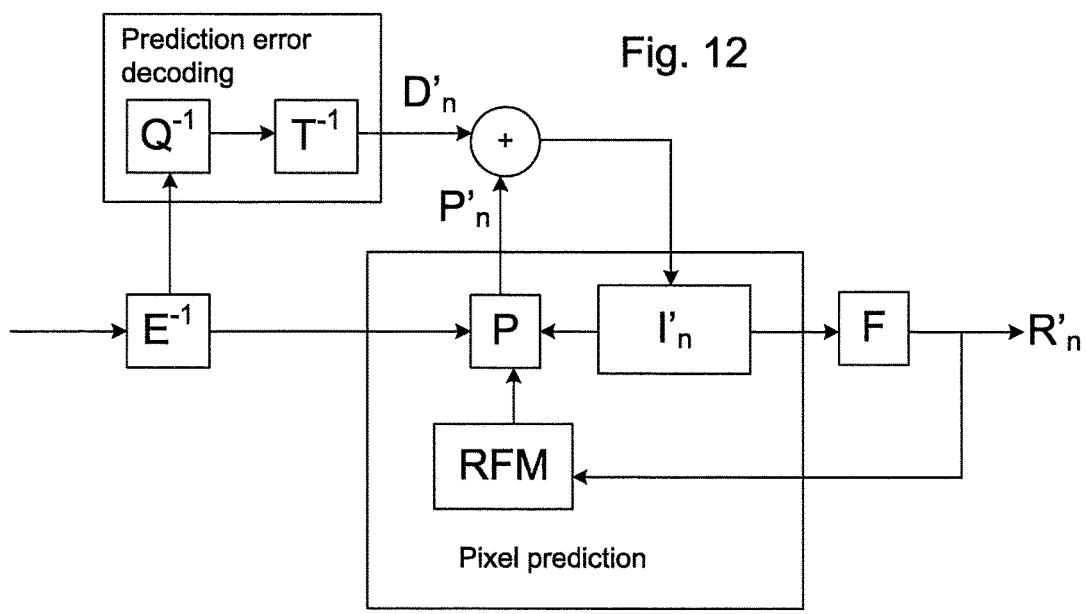
FIG. 12 shows a decoding process according to an embodiment.

FIG. 11 illustrates an example of a video encoder, where $I_n$: Image to be encoded; $P'_n$: Predicted representation of an image block; $D_n$: Prediction error signal; $D'_n$: Reconstructed prediction error signal; I'n: Preliminary reconstructed image;

R'n: Final reconstructed image; T, T$^{-1}$: Transform and inverse transform; Q, Q$^{-1}$: Quantization and inverse quantization; E: Entropy encoding; RFM: Reference frame memory; P$_{inter}$: Inter prediction; P$_{intra}$: Intra prediction; MS: Mode selection; F: Filtering. FIG. 12 illustrates a block diagram of a video decoder where P'$_n$: Predicted representation of an image block; D'$_n$: Reconstructed prediction error signal; I'$_n$: Preliminary reconstructed image; R'$_n$: Final reconstructed image; T$^{-1}$: Inverse transform; Q$^{-1}$: Inverse quantization; E$^{-1}$: Entropy decoding; RFM: Reference frame memory; P: Prediction (either inter or intra); F: Filtering. An apparatus according to an embodiment may comprise only an encoder or a decoder, or both.

Some embodiments have been described in relation to VVC and/or terms and syntax elements of VVC. It needs to be understood that embodiments apply similarly to any video coding format.

Some embodiments have been described in relation to a coding tree unit. It needs to be understood that embodiments apply similarly to any concept that is similar to a coding tree unit, such as a superblock as defined in AV1.

Some embodiments have been described in relation to a conformance cropping window. It needs to be understood that embodiments apply similarly to any indication of an effective picture area, such as an SEI message or a metadata OBU. The indicated effective picture area need not cause cropping as a part of the output of the decoding but may be informatively indicated for the post-processing or displaying process. The post-processing, such as color space conversion, or the displaying may obey the effective picture area and omit processing or display of the samples outside the effective picture area.

Some embodiments have been described in relation to a slice as defined in VVC. It needs to be understood that embodiments apply similarly to any concept that is similar to a slice, such as a tile group as defined in AV1.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of various embodiment.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. An apparatus for encoding, the apparatus comprising:
at least one processor; and
at least one memory storing instructions that, when executed with the at least one processor, cause the apparatus to perform:
receiving a sequence of pictures to be encoded;
defining a refresh period for coded pictures, the refresh period being from a random access point picture, inclusive, to a recovery point picture, exclusive, wherein a decoded version of the recovery point picture and subsequent decoded pictures in output order are correct in content when starting decoding from the random access point picture;
encoding a picture within the refresh period, the picture comprising a refreshed area and an unrefreshed area, wherein the encoding is constrained in a manner that a decoded version of the refreshed area is correct in content when starting decoding from the random access point picture;
determining a value by which a size of the refreshed area increases, per picture, during the refresh period;
selecting, based on the determined value, a number of sample columns or rows outside a conformance cropping window by which offset values of the conformance cropping window are increased to adjust a size of the conformance cropping window so that a boundary between the refreshed area and the unrefreshed area of the picture is aligned with a coding tree unit boundary, wherein a coding tree unit is characterized in one or both of:
one or more prediction processes are disabled across the coding tree unit boundary; or
the coding tree unit is a root unit for partitioning into coding blocks or transform blocks; and
indicating the selected number of sample columns or rows outside the conformance cropping window in or along the bitstream.

2. The apparatus according to claim 1, wherein the instructions, when executed with the at least one processor, cause the apparatus to perform:
inserting a tile column boundary or tile row boundary between the unrefreshed area and the refreshed area.

3. The apparatus according to claim 1, wherein the instructions, when executed with the at least one processor, cause the apparatus to perform:
inserting a slice boundary between the unrefreshed area and the refreshed area.

4. The apparatus according to claim 3, wherein the instructions, when executed with the at least one processor, cause the apparatus to perform
encoding the refreshed area as a first rectangular slice and encoding the unrefreshed area as a second rectangular slice.

5. The apparatus according to claim 3, wherein the instructions, when executed with the at least one processor, cause the apparatus to perform
encoding first one or more complete raster-scan slices covering the refreshed area, and
encoding second one or more complete raster-scan slices covering the unrefreshed area.

6. A method for encoding, comprising:
receiving a sequence of pictures to be encoded;
defining a refresh period for coded pictures, the refresh period being from a random access point picture, inclusive, to a recovery point picture, exclusive, wherein a decoded version of the recovery point picture and subsequent decoded pictures in output order are correct in content when starting decoding from the random access point picture;

encoding a picture within the refresh period, the picture comprising a refreshed area and an unrefreshed area, wherein the encoding is constrained in a manner that a decoded version of the refreshed area is correct in content when starting decoding from the random access point picture;

determining a value by which a size of the refreshed area increases, per picture, during the refresh period;

selecting, based on the determined value, a number of sample columns or rows outside a conformance cropping window by which offset values of the conformance cropping window are increased to adjust a size of the conformance cropping window so that a boundary between the refreshed area and the unrefreshed area of the picture is aligned with a coding tree unit boundary, wherein a coding tree unit is characterized in one or both of:

one or more prediction processes are disabled across the coding tree unit boundary; or the coding tree unit is a root unit for partitioning into coding blocks or transform blocks; and indicating the selected number of sample columns or rows outside the conformance cropping window in or along the bitstream.

7. The method according to claim 6, further comprising:
inserting a tile column boundary or tile row boundary between the unrefreshed area and the refreshed area.

8. The method according to claim 6, further comprising:
inserting a slice boundary between the unrefreshed area and the refreshed area.

9. The method according to claim 8, further comprising encoding the refreshed area as a first rectangular slice and encoding the unrefreshed area as a second rectangular slice.

10. The method according to claim 8, further comprising encoding first one or more complete raster-scan slices covering the refreshed area, and
encoding second one or more complete raster-scan slices covering the unrefreshed area.

11. A non-transitory computer-readable medium comprising program instructions stored thereon for performing at least the following:

receiving a sequence of pictures to be encoded;

defining a refresh period for coded pictures, the refresh period being from a random access point picture, inclusive, to a recovery point picture, exclusive, wherein a decoded version of the recovery point picture and subsequent decoded pictures in output order are correct in content when starting decoding from the random access point picture;

encoding a picture within the refresh period, the picture comprising a refreshed area and an unrefreshed area, wherein the encoding is constrained in a manner that a decoded version of the refreshed area is correct in content when starting decoding from the random access point picture;

determining a value by which a size of the refreshed area increases, per picture, during the refresh period;

selecting, based on the determined value, a number of sample columns or rows outside a conformance cropping window by which offset values of the conformance cropping window are increased to adjust a size of the conformance cropping window so that a boundary between the refreshed area and the unrefreshed area of the picture is aligned with a coding tree unit boundary, wherein a coding tree unit is characterized in one or both of:

one or more prediction processes are disabled across the coding tree unit boundary; or the coding tree unit is a root unit for partitioning into coding blocks or transform blocks; and indicating the selected number of sample columns or rows outside the conformance cropping window in or along the bitstream.

12. The non-transitory computer-readable medium comprising program instructions according to claim 11, wherein the program instructions are further for performing:
inserting a tile column boundary or tile row boundary between the unrefreshed area and the refreshed area.

13. The non-transitory computer-readable medium comprising program instructions according to claim 11, wherein the program instructions are further for performing:
inserting a slice boundary between the unrefreshed area and the refreshed area.

14. The non-transitory computer-readable medium comprising program instructions according to claim 13, wherein the program instructions are further for performing:
encoding the refreshed area as a first rectangular slice; and
encoding the unrefreshed area as a second rectangular slice.

15. The non-transitory computer-readable medium comprising program instructions according to claim 13, wherein the program instructions are further for performing:
encoding first one or more complete raster-scan slices covering the refreshed area; and
encoding second one or more complete raster-scan slices covering the unrefreshed area.

* * * * *